United States Patent
Ito et al.

(10) Patent No.: US 11,102,358 B2
(45) Date of Patent: Aug. 24, 2021

(54) IMAGE FORMING APPARATUS DETERMINING FAILURE WHEN REACTIVATED BEFORE PREPARING A PRINTING OPERATION

(71) Applicant: CANON KABUSHIKI KAISHA, Tokyo (JP)

(72) Inventors: Ryusuke Ito, Toride (JP); Hidenori Matsumoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/916,489

(22) Filed: Jun. 30, 2020

(65) Prior Publication Data

US 2021/0006665 A1 Jan. 7, 2021

(30) Foreign Application Priority Data

Jul. 1, 2019 (JP) .............................. JP2019-122963
Jul. 25, 2019 (JP) .............................. JP2019-137268

(51) Int. Cl.
*H04N 1/00* (2006.01)
*G06K 15/00* (2006.01)

(52) U.S. Cl.
CPC ....... *H04N 1/00037* (2013.01); *G06K 15/408* (2013.01); *H04N 1/0009* (2013.01); *H04N 1/00015* (2013.01); *H04N 1/00076* (2013.01); *H04N 1/00084* (2013.01); *H04N 1/00899* (2013.01)

(58) Field of Classification Search
CPC ........... H04N 1/00015; H04N 1/00037; H04N 1/00076; H04N 1/00084; H04N 1/0009; H04N 1/00885; H04N 1/00899; G06F 3/121; G06F 3/1234; G06K 15/408; G06K 15/409; G06K 2215/0085
See application file for complete search history.

(56) References Cited

U.S. PATENT DOCUMENTS

| | | | |
|---|---|---|---|
| 7,903,268 B2 * | 3/2011 | Aoki .................. | G03G 15/5012 358/1.14 |
| 2016/0216670 A1 | 7/2016 | Eda et al. | |
| 2020/0145543 A1 * | 5/2020 | Yoshimoto ......... | H04N 1/00037 |
| 2020/0220984 A1 * | 7/2020 | Aizono .............. | H04N 1/00689 |

FOREIGN PATENT DOCUMENTS

JP 2013195475 A 9/2013

* cited by examiner

*Primary Examiner* — Scott A Rogers
(74) *Attorney, Agent, or Firm* — Venable LLP

(57) ABSTRACT

An image forming apparatus includes a plurality of parts each configured to operate to form an image; and at least one processor configured to control an operation of the image forming apparatus. The at least one processor has a function of executing the following processing: error detection processing of detecting occurrence of an error of each part; failure portion identification processing of identifying a failure portion which is a cause of the error; and determination processing of determining, in a case where the image forming apparatus is reactivated after the identification of the failure portion by the failure portion identification processing, whether there is a failure in a part corresponding to the failure portion information before execution of a preparation operation for enabling an image forming operation.

20 Claims, 15 Drawing Sheets

|  | POWER SUPPLY SYSTEM | SIGNAL OUTPUT DEVICE | LOAD DRIVER | LOAD |
|---|---|---|---|---|
| ROTARY POSITION CONTROL ABNORMALITY | +24V_B_FU | MOTOR CONTROLLER | MOTOR DRIVER | ROTARY DEVELOPING UNIT |
| CHARGING DC OUTPUT ABNORMALITY | +24V_A_FU | HIGH VOLTAGE CONTROLLER | CHARGING DC HIGH-VOLTAGE DEVICE | CHARGING ROLLER |

|  | POWER SUPPLY |
|---|---|
| ASIC COMMUNICATION ABNORMALITY | +24V_C |

FIG. 12

IMAGE FORMING APPARATUS DETERMINING FAILURE WHEN REACTIVATED BEFORE PREPARING A PRINTING OPERATION

FIELD OF THE INVENTION

The present disclosure relates to a technology for identifying, when an abnormality has occurred in the operation of an image forming apparatus such as a copying machine or a printer, a failure portion that is a cause of the abnormality.

DESCRIPTION OF THE RELATED ART

An image forming apparatus includes a plurality of parts, and an operation of each part is controlled appropriately to form an image on a sheet. When the operation of each part is not finished normally, the image forming apparatus displays an error code, and it notifies a user of an abnormality. In another case, the image forming apparatus transmits an error code to a call center via a network to notify a service engineer of the abnormality. The service engineer of the image forming apparatus repairs the part based on the notified error code to restore the image forming apparatus to a normal state. However, it takes an enormous amount of time for the service engineer to identify the failure portion since he identifies the error portion based on the error code at the time of performing repairs. The user of the image forming apparatus is forced to be inconvenienced during this period of time. In Japanese Patent Application Laid-open No. 2013-195475, there is disclosed a determination method involving accurately distinguishing between an abnormality of drive of a rotation system and an abnormality of output of a transfer current source. Identification of the failure portion leads to reduction of the period of time for the repairs by the service engineer.

After the identification of the failure portion based on the error code, the service engineer replaces the relevant part (failure part). The image forming apparatus is reactivated after the replacement of the part. The image forming apparatus checks whether the failure portion has been repaired at the time of reactivation.

When the part has not been replaced, or when a part after the replacement has also failed, the same abnormality is detected at the time of reactivation, and the same failure portion is identified. The image forming apparatus executes a preparation operation for enabling an image forming operation at the time of reactivation, and an abnormality is detected during the preparation operation or after the preparation operation. Thus, when the failure part has not been replaced, or when the part after the replacement has also failed, an excessive period of time is consumed at the time of reactivation, or a consumable is wasted. Further, when the failure part has not been replaced, the image forming apparatus may execute a failure diagnosis operation that involves an operation of a load every time the image forming apparatus is reactivated. This causes deterioration in usability of the user at the time of using the image forming apparatus.

In view of this, there is a demand for an image forming apparatus configured to determine whether a failure part is replaced with a normal part after the identification of the failure portion.

SUMMARY OF THE INVENTION

An image forming apparatus according to the present disclosure includes: a plurality of parts each configured to operate to form an image; and at least one processor configured to control an operation of the image forming apparatus, wherein the at least one processor has a function of executing the following processing: error detection processing of detecting, under a state in which each of the plurality of parts is caused to operate, occurrence of an error of each part; failure portion identification processing of identifying, in a case where occurrence of an error is detected by the error detection processing, a failure portion which is a cause of the error; storage processing of storing, into a memory, failure portion information on the failure portion identified by the failure portion identification processing; and determination processing of determining, in a case where the image forming apparatus is reactivated after the failure portion is identified by the failure portion identification processing, whether there is a failure in a part corresponding to the failure portion information or not before execution of a preparation operation for enabling an image forming operation.

Further features of the present invention will become apparent from the following description of exemplary embodiments (with reference to the attached drawings).

BRIEF DESCRIPTION OF THE DRAWINGS

FIG. 12 is an explanatory table of the failure portion identification processing.

DESCRIPTION OF THE EMBODIMENTS

At least one embodiment of the present disclosure is described with reference to the drawings.

Image Forming Apparatus

Figure 1:
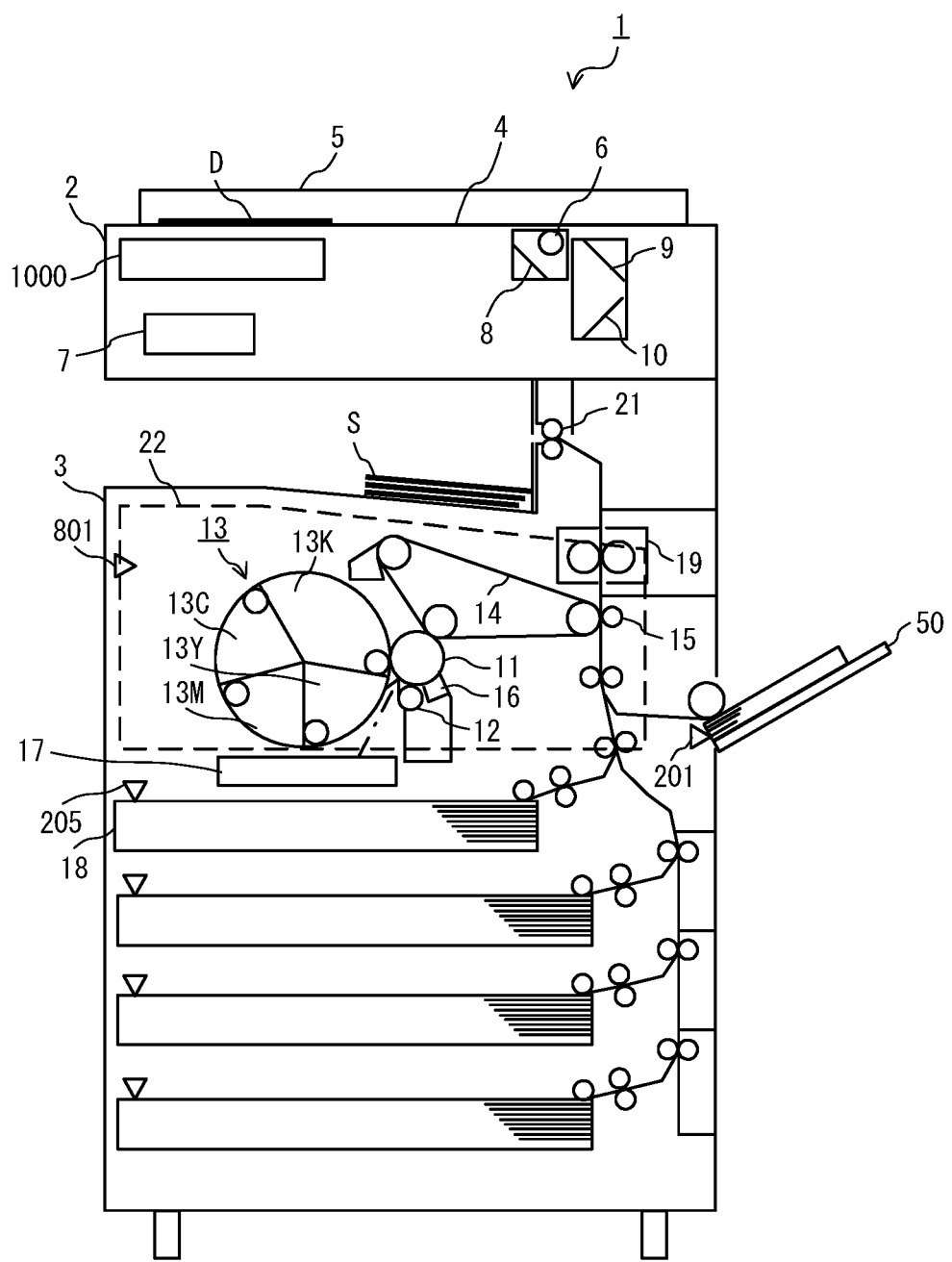
FIG. 1 is a configuration diagram of an image forming apparatus according to at least one embodiment of the present disclosure.

FIG. 1 is a configuration diagram of an image forming apparatus according to at least one embodiment of the present disclosure. The image forming apparatus 1 includes an image reader 2, an image forming unit 3, and an operation device 1000. The image reader 2 is configured to read a document image from a document D. The image forming unit 3 is configured to form an image on a sheet S. The operation device 1000 is a user interface including an input device such as a key button or a touch panel and an output device, for example, a display. The image forming apparatus 1 includes a copying function of forming the original image read by the image reader 2 on the sheet S by the image forming unit 3.

The image reader 2 includes, on its upper side, a document table 4 including a transparent glass plate and a document pressing plate 5. The document D is placed at a predetermined position on the document table 4 with an image side thereof facing downward. The document pressing plate 5 presses the document D placed on the document table 4 in a fixed manner. A lamp 6 for irradiating the document D with light, an image processing unit 7, and an optical system including reflection mirrors 8, 9, and 10 for guiding an optical image of the irradiated document D to the image processing unit 7 are installed below the document table 4. The lamp 6 and the reflection mirrors 8, 9, and 10 move at a predetermined speed to scan the document D. The image processing unit 7 generates image data representing a document image based on the optical image of the irradiated document D.

In order to form an image, the image forming unit 3 includes parts such as a photosensitive drum 11, a first charging roller 12, a rotary developing unit 13, an intermediate transfer belt 14, a transfer roller 15, a cleaner 16, a laser unit 17, and a fixing device 19. The photosensitive drum 11 is a photosensitive member having a drum shape, and the surface of the photosensitive drum 11 is uniformly charged by the first charging roller 12. The laser unit 17 acquires image data from the image reader 2. The laser unit 17 irradiates the photosensitive drum 11 having the charged surface with laser light whose light emission is controlled in accordance with the acquired image data. With this process, an electrostatic latent image that depends on the image data is formed on the surface of the photosensitive drum.

The rotary developing unit 13 causes toners of respective colors of magenta (M), cyan (C), yellow (Y), and black (K) to adhere to the electrostatic latent image formed on the surface of the photosensitive drum 11, to thereby form a toner image on the surface of the photosensitive drum 11. The rotary developing unit 13 is a developing device of a rotational development system. The rotary developing unit 13 includes a developing device 13K, a developing device 13Y, a developing device 13M, and a developing device 13C, and is rotated by a motor (rotary motor). The developing device 13K is configured to develop an image by a toner of black. The developing device 13Y is configured to develop an image by a toner of yellow. The developing device 13M is configured to develop an image by a toner of magenta. The developing device 13C is configured to develop an image by a toner of cyan.

In a case where a monochrome toner image is to be formed on the photosensitive drum 11, the rotary developing unit 13 develops an image by causing the developing device 13K to rotationally move to a development position close to the photosensitive drum 11. In a case where a full-color toner image is to be formed, the rotary developing unit 13 intermittently rotates so that the respective developing devices 13Y, 13M, 13C, and 13K are arranged at develop ment positions in order, to thereby cause those developing devices, which have stopped at the development positions, to develop an image by respective toners.

The toner image formed on the photosensitive drum 11 by the rotary developing unit 13 is transferred onto the intermediate transfer belt 14 being a transfer member. Toners that remain on the photosensitive drum 11 after the transfer are cleaned by the cleaner 16. The toner image transferred onto the intermediate transfer belt 14 is transferred onto the sheet S by the transfer roller 15. The sheet S is supplied to the transfer roller 15 from a paper cassette 18 or a manual feed tray 50. The image forming apparatus 1 includes a feeding mechanism, for example, a roller, for supplying the sheet S to a conveyance path.

The fixing device 19 is installed on a downstream side of the transfer roller 15 with respect to a conveyance direction of the sheet S. The fixing device 19 fixes the transferred toner image onto the sheet S. The sheet S on which the toner image is fixed is delivered from the fixing device 19 to the outside of the image forming apparatus 1 via a discharge roller pair 21.

The image forming apparatus 1 includes a front door 22, which is openable and closable, in order to enable access to consumables such as the photosensitive drum 11 and the rotary developing unit 13 inside the image forming apparatus 1. The front door 22 is opened at the time of repair or inspection of each part described above inside the image forming apparatus 1 or at the time of replacement of consumables inside the image forming apparatus 1. The image forming apparatus 1 includes a front door open/close sensor 801 for detecting opening/closing of the front door 22.

The image forming apparatus 1 includes a paper cassette opening/closing sensor 205 for detecting opening/closing of each paper cassette 18, and a sheet size detection sensor (not shown) configured to detect a size of the sheet S inside the paper cassette 18. In a case where the paper cassette 18 is closed, the paper cassette opening/closing sensor 205 detects this closing. In a case where the paper cassette opening/closing sensor 205 detects closing of the paper cassette 18, the sheet size detection sensor automatically detects the size of the sheet S based on the result of detection.

The image forming apparatus 1 includes a manual sheet feed sensor 201 configured to detect whether there is a sheet S on the manual feed tray 50. In a case where the manual sheet feed sensor 201 has detected the fact that the sheet S is placed on the manual feed tray 50, the image forming apparatus 1 displays, on the operation device 1000, a screen for urging the user to set the size of the placed sheet S. The user sets the sheet size in accordance with the instruction on the screen, to thereby enable the image forming apparatus 1 to recognize the size of the sheet S on the manual feed tray 50.

The configuration of the image forming apparatus 1 is not limited to the above-mentioned configuration, and for example, an image forming apparatus having a well-known configuration in which a plurality of photosensitive drums are arranged along a movement direction of a transfer belt in association with a plurality of color components may be employed. Now, description is given of processing of identifying a failure portion, which is executed by the image forming apparatus 1 having the above-mentioned configuration, by way of two embodiments described below.

First Embodiment

Control Block Diagram

Figure 2:
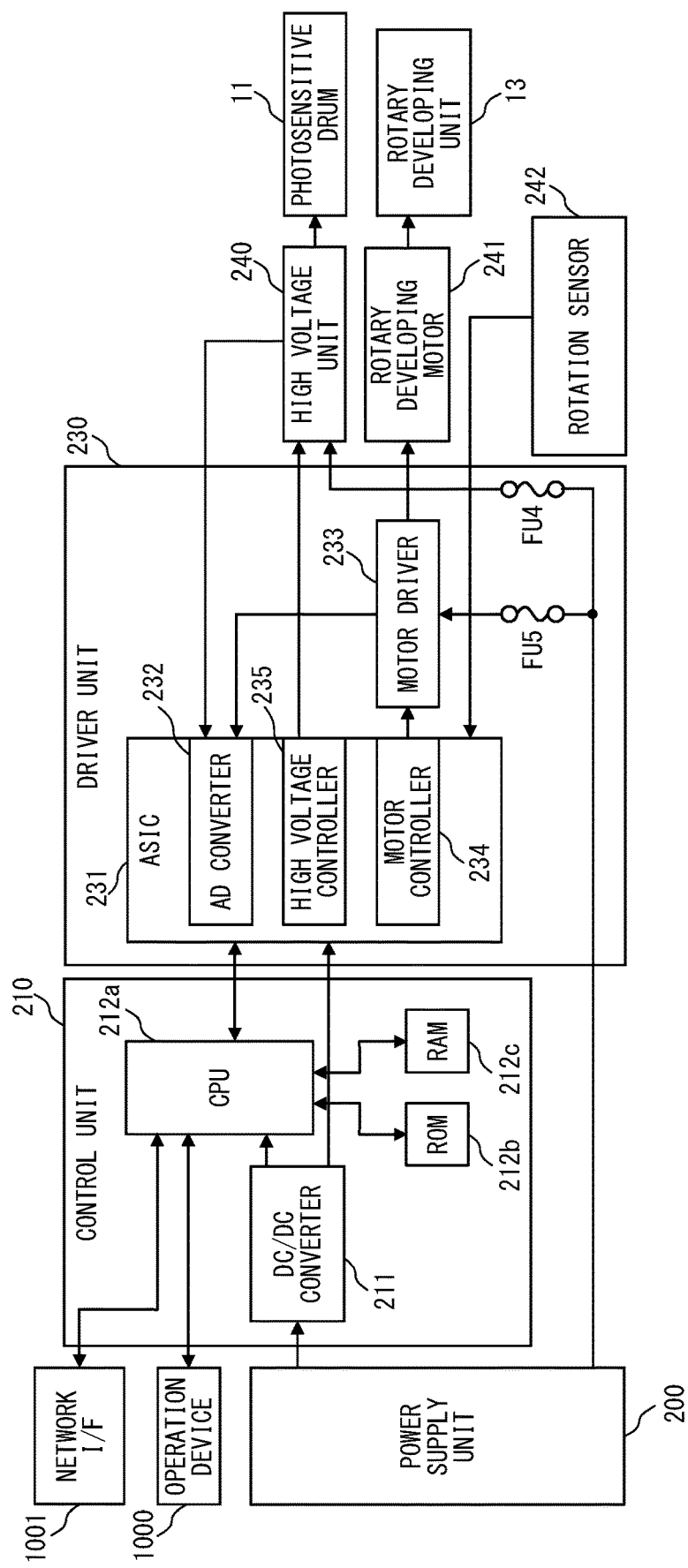
FIG. 2 is a control block diagram of the image forming apparatus.

FIG. 2 is a control block diagram of the image forming apparatus 1. In FIG. 2, components involving control of a charging function of charging the surface of the photosensitive drum 11 and a rotation control function of controlling the rotation of the rotary developing unit 13 are illustrated. The block diagram of FIG. 2 includes a power supply unit 200, a control unit 210, a driver unit 230, a high-voltage unit 240, and a rotary developing motor 241. The power supply unit 200, the control unit 210, the driver unit 230, and the high-voltage unit 240 operate to implement the charging function of charging the surface of the photosensitive drum 11. The power supply unit 200, the control unit 210, the driver unit 230, and the rotary developing motor 241 operate to implement the rotation control function of control the rotation of the rotary developing unit 13.

Figure 3:
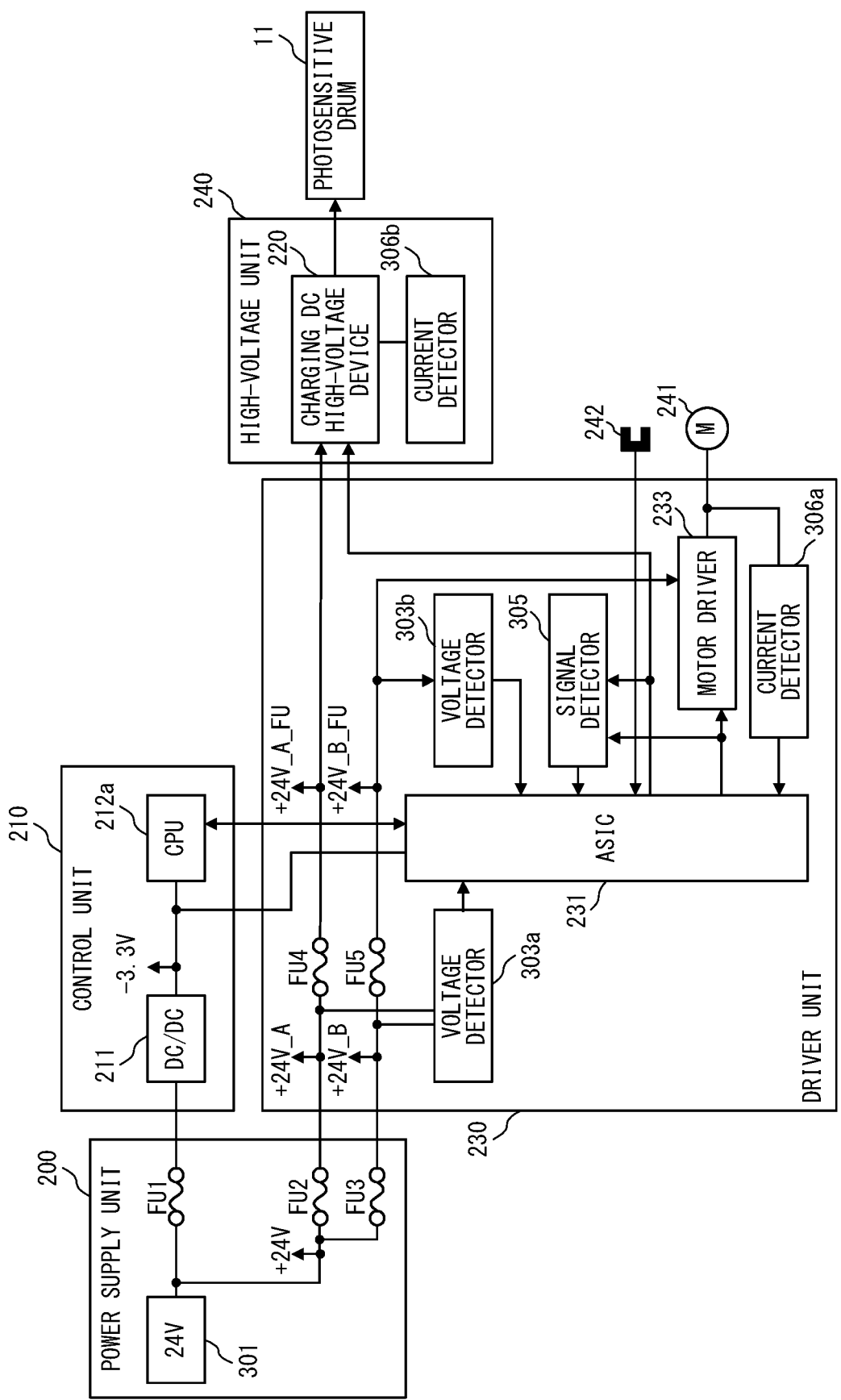
FIG. 3 is a control block diagram of the image forming apparatus.

FIG. 3 is a control block diagram for illustrating a part of the control block diagram of FIG. 2 in detail. In FIG. 3, a part of FIG. 2 is simplified or omitted.

A board (first board) of the power supply unit 200 includes fuses FU1, FU2, and FU3. The control unit 210 includes a DC/DC converter 211, a central processing unit (CPU) 212a, a read only memory (ROM) 212b, and a random access memory (RAM) 212c. The driver unit 230 drives the high-voltage unit 240 and the rotary developing motor 241. To implement this function, a board (second board) of the driver unit 230 includes an application specific integrated circuit (ASIC) 231, the motor driver 233, and fuses FU4 and FU5. Further, in order to identify a failure portion described later, the driver unit 230 includes voltage detectors 303a and 303b, a signal detector 305, and a current detector 306a.

The power supply unit 200 includes a voltage generator 301 configured to output a power supply voltage of +24 V. The power supply unit 200 distributes the power supply voltage to a plurality of voltage supply systems, to thereby supply voltage to each part via the fuses FU1 to FU3. The control unit 210 drops the power supply voltage of +24 V, which has been supplied from the power supply unit 200, to a voltage of 3.3 V by the DC/DC converter 211, to thereby supply voltage to the CPU 212a and the driver unit 230 (ASIC 231), for example. The driver unit 230 supplies the power supply voltage of +24 V, which has been supplied from the power supply unit 200, to the high-voltage unit 240 or the motor driver 233 via the fuses FU4 and FU5. In the first embodiment, diagnosis of those power supply paths is referred to as "power supply system diagnosis".

In the control unit 210, the CPU 212a executes a computer program stored in the ROM 212b, to thereby control an operation of each part to execute various kinds of control sequences relating to image formation. At this time, the RAM 212c is used as a working memory, and stores rewritable data that is required to be stored temporarily or permanently. The RAM 212c stores, for example, a high-voltage set value set in the high-voltage unit 240, drive setting information on a detachable unit, or failure portion information described later. The CPU 212a performs serial communication to/from the ASIC 231. The CPU 212a uses the serial communication to perform a read/write operation for a register or RAM inside the ASIC 231, to thereby control the operation of the ASIC 231.

The ASIC 231 includes function modules such as an AD converter 232 for converting an analog signal value into a digital signal, a high-voltage controller 235 for controlling the high-voltage unit 240, and a motor controller 234 for controlling the rotary developing motor 241. The ASIC 231 is configured to acquire a set value from the CPU 212a, and set each function module based on the set value. Each function module causes its logic circuit to operate based on the set value, to thereby output a control signal. In the first embodiment, the high-voltage controller 235 outputs a control signal (high-voltage control signal) for controlling the operation of the high-voltage unit 240. The motor controller 234 outputs a control signal (motor control signal) for controlling the operation of the motor driver 233. In the first embodiment, diagnosis of those control signals is referred to as "signal output device diagnosis".

The high voltage unit 240 and the motor driver 233 each function as a load controller configured to control an operation of a load connected thereto, based on the voltage supplied from the power supply system and the control signal acquired from the signal output device. In the first embodiment, diagnosis of the high voltage unit 240 and the motor driver 233 is referred to as "load driver diagnosis".

For example, the motor driver 233 includes a driver integrated circuit (IC) for driving the rotary developing motor 241. The driver IC controls rotation of the rotary developing motor 241 based on a motor control signal for driving the rotary developing motor 241. The rotary developing motor 241 is rotated to rotate the rotary developing unit 13. A rotation sensor 242 for detecting rotation is provided in the rotary developing unit 13. The rotary developing unit 13 is rotated to cause the rotation sensor 242 to transmit to the ASIC 231 a detection result indicating detection of rotation.

The ASIC 231 converts the result of detection by the rotation sensor 242, which is an analog signal, into a digital signal by the AD converter 232, and transmits the digital signal to the CPU 212a. The CPU 212a controls the position of the rotary developing unit 13 based on the acquired detection result. Through the position control, the developing device to be used for development is moved to the development position. In a case where the position control (movement) is not finished within a predetermined period of time (5 seconds in the first embodiment), the CPU 212a determines that an abnormality has occurred in the position control of the rotary developing unit 13. That is, the rotation sensor 242 detects a control abnormality of the rotary developing unit 13 being the load. A plurality of sensors (abnormality detectors) configured to detect such a control abnormality are provided in association with the respective loads. When occurrence of a control abnormality is determined in this manner, the CPU 212a stops an image forming operation, and executes failure portion identification processing for identifying a failure portion being a cause of the abnormality.

The CPU 212a is connected to the operation device 1000 and a network interface (I/F) 1001. The CPU 212a acquires an input signal, for example, an instruction from the operation device 1000, and displays a screen on the operation device 1000. The CPU 212a performs communication to/from an external device, for example, a computer, by the network I/F 1001 via a predetermined network.

Identification of Failure Portion

The failure portion identification processing is executed by a failure portion identification function. The failure portion identification function is prepared for each part. The failure portion identification function in the first embodiment includes a power supply system failure portion identification function, a signal output device failure portion identification function, a load driver failure portion identification function, and a load failure portion identification function. The power supply system failure portion identification function is used for identifying a failure portion of the power supply system. The signal output device failure portion identification function is used for identifying a failure portion of the signal output device. The load driver failure portion identification function is used for identifying a failure portion of the load driver. The load failure portion identification function is used for identifying a failure portion of the load.

Figures 4, 5:
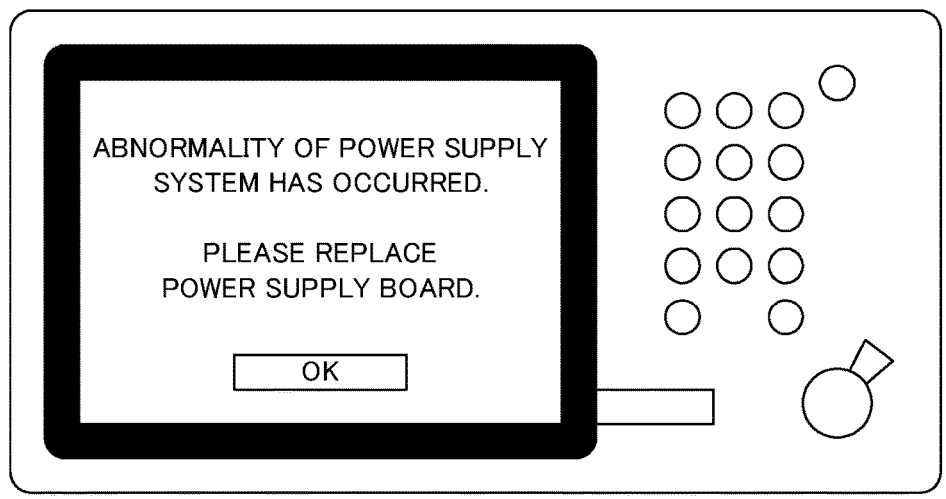
FIG. 4 is an explanatory table of failure portion identification processing.
FIG. 5 is a diagram for illustrating an example of a result of processing displayed on an operation device.

The table of FIG. 4 is a failure portion identification table storing information (failure portion identification information) indicating, for each type of control abnormality, portions of the power supply system, the signal output device, the load driver, and the load whose states are to be checked. The failure portion identification table is stored in the ROM 212b of the control unit 210. The CPU 212a refers to each piece of failure portion identification information of the failure portion occurrence table at the time of occurrence of a control abnormality, and checks the states of parts related to the control abnormality from items on the left side of the table in order, to thereby identify a failure portion. Parts to be replaced of a portion being the failure portion (parts required to be replaced) are referred to as "failure parts".

In the following, description is given of the failure portion identification processing taking occurrence of a position control abnormality of the rotary developing unit 13 as an example. The processing of identifying the failure portion at a time when a charging DC output abnormality is detected is similarly executed, and the states of parts related to the control abnormality are checked from items on the left side of the table in order, to thereby identify the failure portion.

The CPU 212a first starts to check the power supply by using the power supply failure portion identification function. As shown in FIG. 4, in a case where a position control abnormality of the rotary developing unit 13 occurs, the CPU 212a checks the voltage of +24V_B_FU, which is at a subsequent stage of the fuse FU5, in order to diagnose the failure portion of the power supply system. In order to check the voltage of +24V_B_FU, the voltage detector 303a of the driver unit 230 detects whether a value of the voltage of +24V_B, which is at a preceding stage of the fuse FU5, is equal to or larger than a predetermined value (threshold value). In this case, the threshold value is set to 18 V.

The result of detection by the voltage detector 303a is transmitted to the CPU 212a via the ASIC 231. The CPU 212a checks the failure portion based on the result of detection by the voltage detector 303a. In a case where the detection result indicates the fact that the value of the voltage of +24V_B is equal to or larger than 18 V, the CPU 212a determines that the output by the power supply unit 200 is normal. In a case where the detection result indicates the fact that the value of the voltage of +24V_B is smaller than 18 V, the CPU 212a determines that the output by the power supply unit 200 is abnormal. When determining that the output by the power supply unit 200 is abnormal, the CPU 212a determines that a path (fuse FU3) that outputs the voltage of +24V_B of the power supply unit 200 is the failure portion. The image forming apparatus 1 according to the first embodiment does not support replacement of only the fuse parts, and replacement is performed in units of power supply units. Thus, in this case, the CPU 212a determines the power supply unit 200 as the failure part (parts to be replaced) (power supply output abnormality).

In a case where the voltage of +24V_B is normal, the voltage detector 303b of the driver unit 230 detects whether the value of the voltage of +24V_B_FU, which is at the subsequent stage of the fuse FU5, is equal to or larger than a predetermined value (threshold value). The voltage detector 303b executes detection processing similarly to the voltage detector 303a. The detection result is transmitted to the CPU 212a via the ASIC 231. The CPU 212a determines whether the voltage of +24V_B_FU is normal based on the result of detection by the voltage detector 303b. When determining that the voltage of +24V_B_FU is abnormal, the CPU 212a determines that the fuse FU5 is the failure portion. Similarly to the power supply unit 200, replacement of only the fuse parts is not supported, and replacement is performed in units of driver units. Thus, in this case, the CPU 212a determines the driver unit 230 as the failure part (blowout of fuse). When determining that the voltages of +24V_B and +24V_B_FU are normal, the CPU 212a determines that the power supply system is normal.

In a case where the power supply system is normal, the CPU 212a diagnoses the failure portion of the signal output device by using the signal output device failure portion identification function. In order to diagnose the failure portion of the signal output device, the CPU 212a checks a control signal (motor control signal) transmitted from the motor controller 234 of the ASIC 231 to the motor driver 233. The motor control signal contains signals such as a rotation direction, speed, or drive mode of the rotary developing motor 241.

In order to check a motor control signal, the CPU 212a first sets the ASIC 231 so that the motor control signal is output at a high level. The signal detector 305 of the driver unit 230 compares the value of the motor control signal with a predetermined threshold value. In this case, the threshold value is set to 2.8 V.

The result of comparison by the signal detector 305 is transmitted to the CPU 212a via the ASIC 231. The CPU 212a checks the output state of a motor control signal based on the result of comparison by the signal detector 305. In a case where the comparison result indicates the fact that the value of the motor control signal is equal to or larger than 2.8 V, the CPU 212a determines that the control signal (motor control signal) is normal. In a case where the comparison result indicates the fact that the value of the motor control signal is smaller than 2.8 V, the CPU 212a determines that the control signal (motor control signal) is abnormal. When determining that the control signal is abnormal, the CPU 212a identifies the motor controller 234 as the failure portion. In this case, the CPU 212a determines the driver unit 230 as the failure portion (signal output abnormality).

Next, the CPU 212a sets the ASIC 231 so that the motor control signal is output at a low level. The signal detector 305 compares the value of the motor control signal with a predetermined threshold value, to thereby check the control signal. In this case, the threshold value is set to 0.8 V.

The result of comparison by the signal detector 305 is transmitted to the CPU 212a via the ASIC 231. The CPU 212a diagnoses the output state of the motor control signal based on the result of comparison by the signal detector 305. When the comparison result indicates the fact that the value of the motor control signal is smaller than 0.8 V, the CPU 212a determines that the control signal (motor control signal) is normal. When the comparison result indicates the fact that the value of the motor control signal is equal to or larger than 0.8 V, the CPU 212a determines that the control signal (motor control signal) is abnormal. When determining that the control signal is abnormal, the CPU 212a identifies the motor controller 234 as the failure portion. In this case, the CPU 212a determines the driver unit 230 as the failure portion (signal output abnormality).

In a case where the power supply system and the signal output device are normal, the CPU 212a diagnoses the failure portion of the load driver by using the load driver failure portion identification function. The CPU 212a checks the output of the motor driver 233 in order to diagnose the failure portion of the load driver.

In order to check the output of the motor driver 233, the CPU 212a first sets the motor controller 234 of the ASIC 231 to cause operation of the rotary developing motor 241. The ASIC 231 (motor controller 234) being the signal output device transmits a motor control signal to the motor driver 233.

The current detector 306a of the driver unit 230 detects an output current from the load driver (motor driver 233) under a state in which the voltage of +24V_B_FU and the motor control signal are input to the load driver (motor driver 233). In order to check whether there is an abnormality of the motor driver 233, the current detector 306a detects whether a value of a current flowing from the motor driver 233 to the rotary developing motor 241 is equal to or larger than a predetermined value (equal to or larger than threshold value). In this case, the threshold value is set to 100 mA.

The result of detection by the current detector 306a is transmitted to the CPU 212a via the ASIC 231. In a case where the detection result obtained by the current detector 306a indicates the fact that the value of the current flowing through the rotary developing motor 241 is equal to or larger than 100 mA, the CPU 212a determines that the motor driver 233 is normal. In a case where the detection result indicates the fact that the value of the current flowing through the rotary developing motor 241 is smaller than 100 mA, the CPU 212a determines that the motor driver 233 is abnormal. When determining that the motor driver 233 has failed, the CPU 212a identifies the motor driver 233 as the failure portion. In this case, the CPU 212a determines the driver unit 230 as the failure part (load drive abnormality).

At this time, in a case where the rotary developing motor 241 is in operation, the CPU 212a determines that the driver unit 230 has failed, whereas when the rotary developing motor 241 is not in operation, the CPU 212a determines that an actuator has failed (actuator abnormality), and identifies the rotary developing motor 241 as the failure part.

In a case where the power supply system, the signal output device, and the load driver are normal, the CPU 212a checks the failure portion of the load by using the load failure portion identification function. The CPU 212a executes rotation control of the rotary developing motor 241 again, to thereby check the load (rotary developing unit 13). In order to check the load, the CPU 212a checks whether the rotation sensor 242 detects rotation of the rotary developing unit 13. The CPU 212a acquires the result of detection by the rotation sensor 242 via the ASIC 231. In a case where the rotation sensor 242 does not detect rotation of the rotary developing unit 13, the CPU 212a determines that the load is abnormal, and identifies the rotary developing unit 13 as the failure portion (load abnormality). In this case, the rotary developing unit 13 is the failure part.

In a case where the rotation sensor 242 detects rotation of the rotary developing unit 13, the CPU 212a determines that the load is normal. In response to the detection of rotation, the CPU 212a determines that the failure portion cannot be identified.

After the failure portion identification processing described above, the CPU 212a notifies of the processing result. The CPU 212a notifies of the processing result by displaying the processing result on the operation device 1000, for example. FIG. 5 is a diagram for illustrating an example of a result of processing displayed on the operation device 1000.

In FIG. 5, an instruction to replace the identified failure part is notified. In this example, the fact that the power supply unit 200 (first board) is the failure part and is required to be replaced is displayed on the operation device 1000. In this manner, in the first embodiment, a display manner is changed from the related-art simple display of an error code indicating a control abnormality to detailed display of displaying a code or message specifically indicating the failure part. With this detailed display, the service engineer can recover the image forming apparatus 1 from the failure state (error state) within a short period of time by replacing the notified failure part without investigating the failure cause. As a result, it is possible to reduce the downtime of the image forming apparatus 1.

The processing result may be notified to a call center via the network I/F 1001 in addition to display on the operation device 1000. An instruction to replace the failure part is notified to the call center via the network I/F 1001 at the time of occurrence of an abnormality, to thereby enable the service engineer to know the failure part without visiting the installation location of the image forming apparatus 1. As a result, the service engineer can prepare parts for replacement in advance at the time of visiting the installation location, and quickly repair the image forming apparatus 1 to recover the image forming apparatus 1 from the failure state within a short period of time.

In the above description of the failure portion identification processing, the failure portion identification processing for the signal output device is executed after the failure portion identification processing for the power supply system. However, this order may be opposite. This is because input from the power supply system to the load driver and input from the signal output device to the load driver are executed in parallel.

Operation Mode

Figure 6:
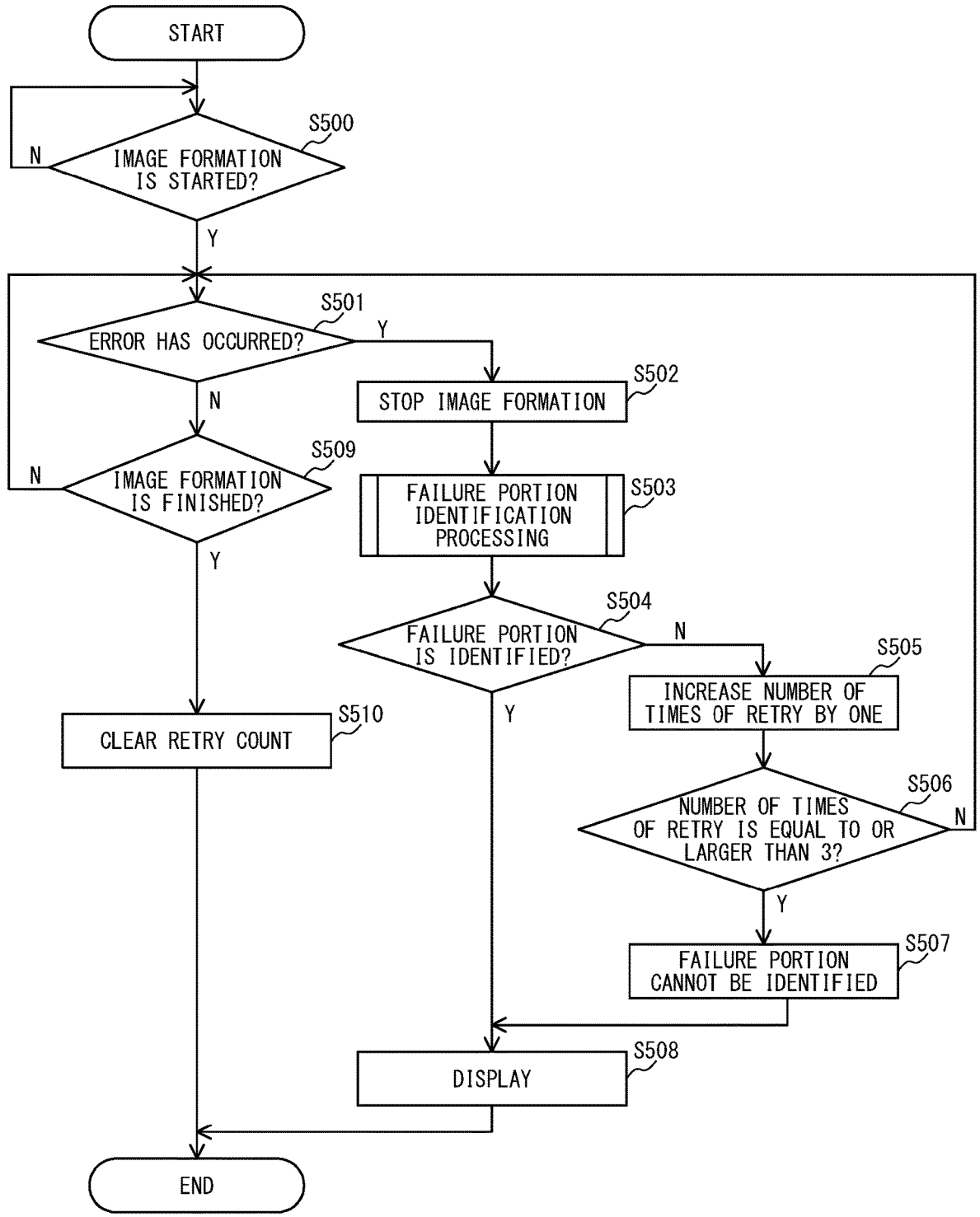
FIG. 6 is a flow chart for illustrating image forming processing including the failure portion identification processing.

FIG. 6 is a flow chart for illustrating image forming processing including the failure portion identification processing. In a case where an error (control abnormality) has occurred during the image forming processing, the image forming apparatus 1 starts the processing of identifying the failure portion being a cause of the error.

The CPU 212a waits for an instruction to start image formation from the user via the operation device 1000 or the network I/F 1001 (Step S500: N). In a case where an instruction to start image formation is received (Step S500: Y), the CPU 212a starts to form an image in accordance with the instruction. The CPU 212a monitors occurrence of an error due to a control abnormality of each part until the image formation is finished (Step S501: N, and Step S509: N). The CPU 212a monitors occurrence of an error based on the result of detection by various kinds of sensors installed inside the image forming apparatus 1. In a case where an error has occurred, the CPU 212a retries a control operation that depends on the type of the error. The CPU 212a includes a retry counter configured to count the number of times of retry for each type of an error. In a case where the image formation is finished (Step S509: Y), the CPU 212a clears the number of times of retry for each type of an error stored in the retry counter to all "0" (Step S510). In a case where an error has not occurred or in a case where a control abnormality is resolved by retry after an error has occurred, the image forming processing is finished.

In a case where an error has occurred during the image formation (Step S501: Y), the CPU 212a stops the image formation (Step S502), and executes the processing of identifying the failure portion (Step S503). Now, description is given of an exemplary case in which an error of not detecting rotation of the rotary developing unit 13 has occurred (position control abnormality of rotary developing unit 13). The rotary developing unit 13 is rotationally driven by the rotary developing motor 241. Occurrence of this error is detected in a case where the rotation sensor 242 has not detected rotation of the rotary developing unit 13 even after a predetermined period of time has elapsed since the rotary developing motor 241 started control of rotating the rotary developing unit 13. The processing of identifying the failure portion (diagnosis) is started in response to occurrence of the control abnormality of the rotary developing unit 13. The detailed failure portion identification processing is described later.

The CPU 212a determines whether the failure portion is identified by the failure portion identification processing (Step S504). In a case where the failure portion is identified (Step S504: Y), as illustrated in FIG. 5, the CPU 212a finishes the processing by displaying failures parts to be replaced on the operation device 1000 (Step S508). At this time, the CPU 212a may notify the call center of the failure part to be replaced via the network I/F 1001.

In a case where the failure portion is not identified (Step 5504: N), the CPU 212a increases the number of times of retry due to a position control abnormality of the rotary developing unit 13 by one (Step S505). The CPU 212a determines whether the number of times of retry is equal to or larger than a predetermined count (equal to or larger than 3 in this case) (Step S506). In a case where the number of times of retry is smaller than the predetermined count (smaller than 3) (Step 5506: N), the CPU 212a resumes the image formation to monitor again whether there is occurrence of an error. That is, the CPU 212a allows the execution of image formation until an error is detected a predetermined number of times. With this process, the image forming processing is executed again.

In a case where the number of times of retry is equal to or larger than the predetermined count (equal to or larger than 3) (Step S506: Y), the CPU 212a determines that the failure portion has failed to be identified (Step S507). In this case, the CPU 212a displays the fact that the failure portion has failed to be identified on the operation device 1000, and stops the operation of the apparatus under the error state (Step S508). At this time, the CPU 212a may notify the call center of occurrence of an abnormality via the network I/F 1001. In this case, similarly to the related art, the service engineer investigates the cause of the error.

As described above, the image forming apparatus 1 executes the image forming processing including the failure portion identification processing, and normally finishes the image forming processing in a case where an error has not occurred, or in a case where an error has been resolved through retry even at the time of occurrence of an error. In a case where an error has occurred and the failure portion is identified successfully, the image forming apparatus 1 notifies the user or the service engineer of the failure part.

Figure 7:
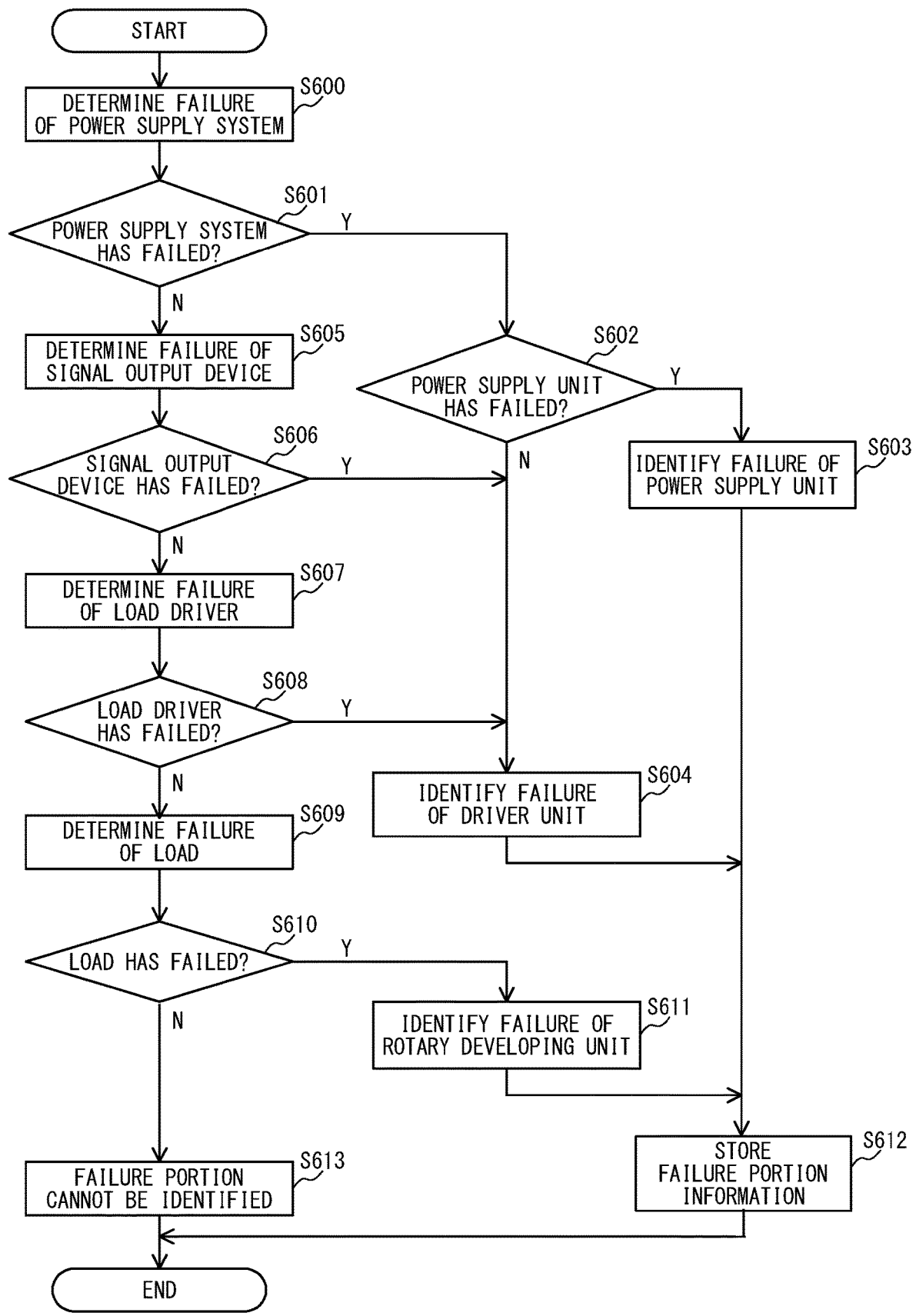
FIG. 7 is a flow chart for illustrating the failure portion identification processing.

FIG. 7 is a flow chart for illustrating the failure portion identification processing, which is executed in Step S503. FIG. 7 is an illustration of the failure portion identification processing in a case where a control abnormality of the rotary developing unit 13 has occurred. As described with reference to FIG. 4, the CPU 212a identifies the failure portion in order from the power supply system, the signal output device, the load driver, and the load.

The CPU 212a first determines a failure of the power supply system (Step S600). The CPU 212a determines whether the power supply system has failed by using the power supply system failure portion identification function. In a case where the power supply system has failed (Step S601: Y), the CPU 212a determines whether the power supply unit 200 (fuse FU3) has failed (Step S602). In a case where the power supply unit 200 (fuse FU3) has failed (Step S602: Y), the CPU 212a identifies the fuse FU3 as the failure portion, and the power supply unit 200 as the failure part (Step S603). In a case where the power supply unit 200 is not a failure part (Step S602: N), the CPU 212a identifies the fuse FU5 as the failure portion, and the driver unit 230 as the failure part (Step S604).

The CPU 212a stores failure portion information representing the identified failure part into an area of the RAM 212c that can store data permanently (Step S612). The failure portion information contains information representing the identified failure part and information representing the failure portion identification function used to identify that failure portion. For example, the failure portion information contains information representing the power supply unit 200 and the power supply system failure portion identification function in a case where the power supply unit 200 is determined to be the failure part. The failure portion information contains information representing the driver unit 230 and the power supply system failure portion identification function in a case where the driver unit 230 is determined to be the failure part.

In a case where the power supply system has not failed (Step S601: N), the CPU 212a determines a failure of the signal output device by using the signal output device failure portion identification function (Step S605). In a case where the ASIC 231 has not output an appropriate control signal, this means that the signal output device has failed. In a case where the signal output device has failed (Step S606: Y), replacement of a part of only the signal output device (motor controller 234) is not supported, and thus the CPU 212a identifies the driver unit 230 as the failure part (Step S604). The CPU 212a stores the failure portion information representing the identified failure part into the area of the RAM 212c that can store data permanently (Step S612). In this case, the failure portion information contains information representing the driver unit 230 and the signal output device failure portion identification function.

In a case where the signal output device has not failed (Step S606: N), the CPU 212a checks the signal output state of the load driver by using the load driver failure portion identification function (Step S607). In a case where an appropriate signal has not been output, this means a failure of the load driver. In a case where the load driver has failed (Step S608: Y), the CPU 212a identifies the driver unit 230 as the failure part because the motor driver 233 is mounted on the driver unit 230 (Step S604). The CPU 212a stores the failure portion information representing the identified failure part into the area of the RAM 212c that can store data permanently (Step S612). In this case, the failure portion information contains information representing the driver unit 230 and the load driver failure portion identification function.

In a case where the load driver has not failed (Step S608: N), the CPU 212a checks the operation of the load by using the load failure portion identification function (Step S609). The load is controlled to operate, and in a case where the load does not operate, this means a failure of the load. In a case where the load has failed (Step S610: Y), the CPU 212a identifies the rotary developing unit 13 as the failure part (Step S611). The CPU 212a stores the failure portion information representing the identified failure part into the area of the RAM 212c that can store data permanently (Step S612). In this case, the failure portion information contains information representing the rotary developing unit 13 and the load failure portion identification function.

In a case where the load has not failed (Step S610: N), the CPU 212a determines that the failure portion cannot be identified (Step S613). In this case, the failure portion information is not stored. Further, when it is determined that the failure portion cannot be identified, it is determined in the processing of Step S504 of FIG. 6 that the failure portion is not identified, and the number of times of retry is increased by one in the processing of Step S505.

After the failure portion is identified by the above-mentioned processing, the service engineer usually replaces the failure part. After that, the image forming apparatus 1 executes a preparation operation for turning on the power supply again and enabling an image forming operation. In the first embodiment, processing of checking whether the failure part has been appropriately replaced is executed before the execution of this preparation operation. In a case where the failure portion, which has already been determined to have a "failure" by the failure portion identification processing, is determined to be "normal" by the same failure portion identification function again, it can be determined that there is a change in the failure part. That is, it can be determined that the failure part has been replaced with a normal part after the identification of the failure portion. However, in a case where the failure portion is determined to have a "failure" by the same failure portion identification function again, there is no change in the failure part, and thus it can be determined that the failure part has not been replaced after the identification of the failure portion, or the part after the replacement has also failed.

For example, it is assumed that the voltage of the motor control signal output from the motor controller 234 is equal to or larger than 0.8 V based on the signal output device failure portion identification function. In this case, the driver unit 230 is determined to be the failure part. After that, in a case where the signal output device failure portion identification function is used again, the voltage of the motor control signal output from the motor controller 234 is smaller than 0.8 V as long as the driver unit 230 has been replaced with a normal unit. However, in a case where the driver unit 230 has not been replaced with a normal unit, the voltage of the motor control signal output from the motor controller 234 is likely to be equal to or larger than 0.8 V similarly to the time of the failure portion identification processing. That is, it is possible to check whether the failure part has been replaced with a normal part by identifying the failure portion again through use of the failure portion identification function, which has been used at the time of the failure portion identification processing.

Processing after Identification of Failure Portion

Figure 8:
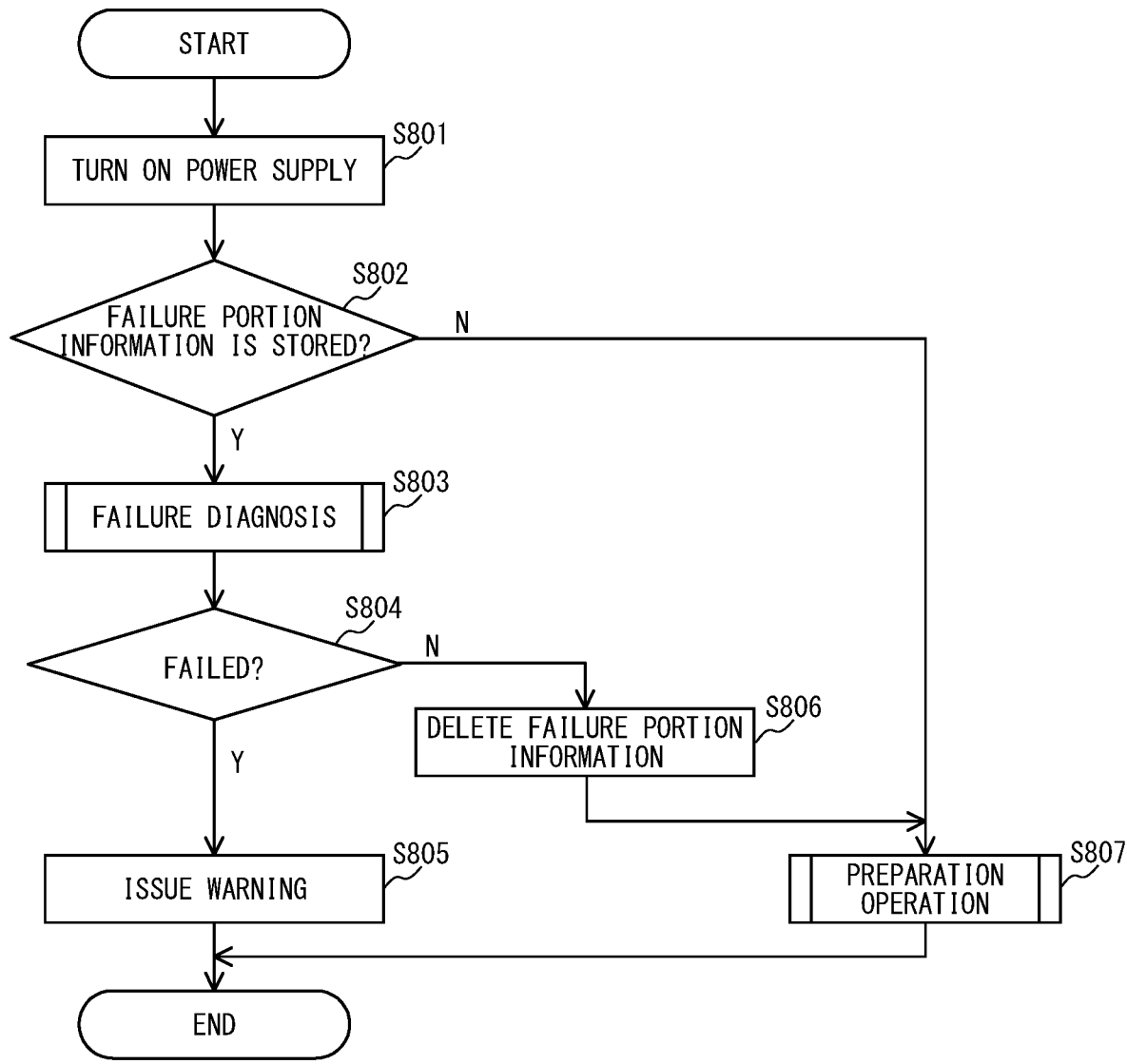
FIG. 8 is a flow chart for illustrating the failure portion identification processing.

FIG. 8 is a flow chart for illustrating the failure portion identification processing to be executed before the execution of the preparation operation after the identification of the failure portion. In a case where the failure part is replaced, the power supply of the image forming apparatus 1 is temporarily turned off. The power supply is turned on after the replacement of the failure part, and then the image forming apparatus 1 is reactivated and starts to execute the preparation operation. In the first embodiment, after the identification of the failure portion, the image forming apparatus 1 executes the failure portion identification processing before the image forming apparatus 1 is reactivated and starts to execute the preparation operation.

In a case where the power supply is turned on and the CPU 212a is reactivated (Step S801), the CPU 212a checks whether the failure portion information is stored in the RAM 212c (Step S802). In a case where the failure portion information is not stored (Step S802: N), the CPU 212a determines that the failure portion is not identified before the reactivation. In this case, the CPU 212a executes a normal preparation operation for an image forming operation, such as adjustment or printing operation (Step S807). Through completion of the preparation operation, the image forming apparatus 1 is ready to execute a normal image forming operation.

In a case where the failure portion information is stored (Step S802: Y), the CPU 212a executes only the failure portion identification function used at the time of the identification of the failure portion based on the failure portion information, and executes failure diagnosis (Step S803). For example, in a case where the driver unit 230 is the failure part, and failure portion information indicating the fact that the signal output device failure portion identification function has been used at that time is stored, the CPU 212a uses the signal output device failure portion identification function to execute the failure diagnosis. Details of the failure diagnosis are similar to those of the processing of Step S605 of FIG. 7.

The CPU 212a determines whether a part of corresponding to the failure portion information has failed through the failure diagnosis (Step S804). In a case where the part of corresponding to the failure portion information has failed (Step S804: Y), the CPU 212a displays a warning screen on the operation device 1000 (Step S805). For example, in a case where the voltage of the motor control signal output from the motor controller 234 is equal to or larger than 0.8 V based on the signal output device failure portion identification function, the CPU 212a determines that the driver unit 230 has failed. In this case, the CPU 212a determines that the failure part has not been replaced, or a part after the replacement has also failed. The warning screen may be the same screen as the screen displayed in the processing of Step S508 of FIG. 6 at the time of the identification of the previous failure portion, for example. Further, in addition to the display on the operation device 1000, the CPU 212a may give a notification to the call center via the network I/F 1001. In this case, the image forming apparatus 1 cannot execute a normal image forming operation because the preparation operation is not executed.

In a case where the part of corresponding to the failure portion information is normal (Step S804: N), the CPU 212a determines that the failure part has been replaced with a normal part. For example, in a case where the voltage of the motor control signal output from the motor controller 234 is smaller than 0.8 V based on the signal output device failure portion identification function, the driver unit 230 (motor controller 234) is likely to operate normally. In this case, the CPU 212a deletes the failure portion information stored in the RAM 212c (Step S806). After that, the CPU 212a executes a normal preparation operation for an image forming operation, such as adjustment or printing operation (Step S807). Through completion of the preparation operation, the image forming apparatus 1 is ready to execute a normal image forming operation.

In this manner, the image forming apparatus 1 according to the first embodiment determines whether the failure part has been replaced before the preparation operation for enabling an image forming operation after the identification of the failure portion. In a case where the image forming apparatus 1 has identified the failure portion once, the image forming apparatus 1 does not execute a preparation operation, such as adjustment or printing operation, until the failure part is replaced. Therefore, it is possible to prevent an excessive period of time from being consumed at the time of reactivation, or a consumable from being wasted.

In a case where the failure part has been replaced with a normal part, initialization processing is required to be executed depending on the part. In this case, the CPU 212a, which has determined that the failure part has been replaced with a normal part, automatically executes the initialization operation. Now, description is given of a case in which the rotary developing unit 13 is identified as the failure part. In a case where the rotary developing unit 13 is replaced, it is required to execute the initialization processing, such as idle rotation of the developing device or clearing of the counter of the developing device, depending on the color of the replaced developing device.

Figure 9:
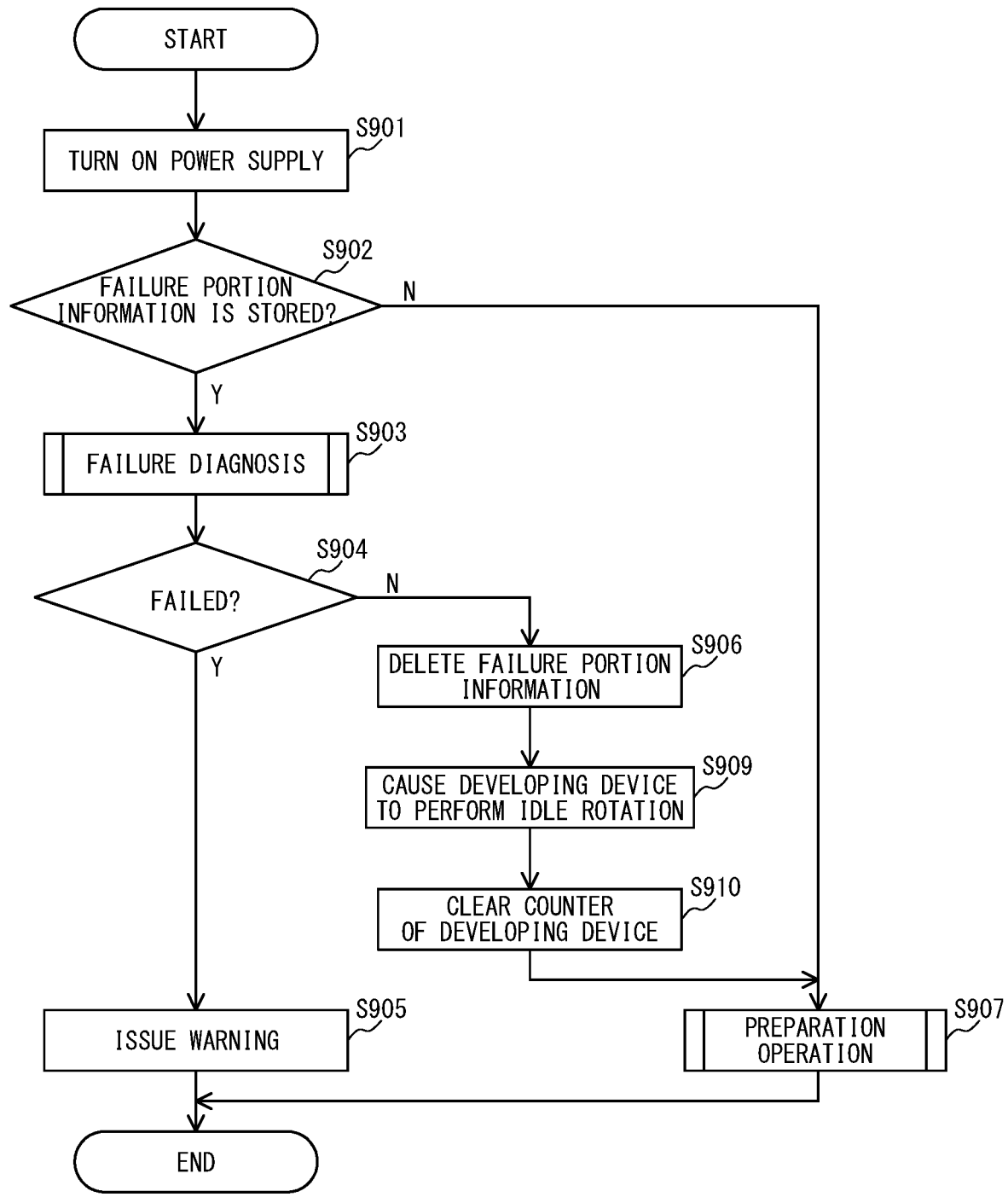
FIG. 9 is a flow chart for illustrating the failure portion identification processing involving initialization processing.

FIG. 9 is a flow chart for illustrating the failure portion identification processing involving the initialization processing to be executed before the execution of the preparation operation after the identification of the failure portion. Similarly to the case of the processing of FIG. 8, after the identification of the failure portion, the image forming apparatus 1 executes the failure portion identification processing before the image forming apparatus 1 is reactivated to start to execute the preparation operation.

In a case where the power supply is turned on and the CPU 212a is reactivated (Step S901), the CPU 212a checks whether the failure portion information is stored in the RAM 212c (Step S902). In a case where the failure portion information is not stored (Step S902: N), the CPU 212a determines that the failure portion is not identified before the reactivation, or determines that replacement of the part has been detected at the time of previous activation, the failure portion information has been deleted, and initialization processing for the part has been complete. In this case, the CPU 212a executes a normal preparation operation for an image forming operation without executing initialization processing for the part after the replacement (Step S907). Through the completion of the preparation operation, the image forming apparatus 1 is ready to execute a normal image forming operation.

In a case where the failure portion information is stored (Step S902: Y), the CPU 212a executes processing similar to that of Step S803 to Step S806 of FIG. 8 (Step S903 to Step S906). That is, the CPU 212a executes failure diagnosis, and in a case where the failure part has not been replaced with a normal part, the CPU 212a displays a warning screen on the operation device 1000. In a case where the failure part has been replaced with a normal part, the CPU 212a deletes the failure portion information.

The CPU 212a, which has deleted the failure portion information, causes a developing device (any one of developing devices 13Y, 13M, 13C, and 13K) of the corresponding color to perform idle rotation for a fixed period of time (Step S909). With this, a developer seal attached to the developing device is automatically removed, and the developing device can be used. In the first embodiment, the developing device performs idle rotation for one second. In addition to the idle rotation, the initialization processing includes an initialization operation relating to the developing device, such as initialization of a toner density sensor configured to measure the toner density of the developing device, cleaning of the transfer roller 15, or automatic grayscale correction.

The CPU 212a clears the counter of the developing device (any one of developing devices 13Y, 13M, 13C, and 13K) of the corresponding color to an initial value (Step S910). After that, the CPU 212a executes a normal preparation operation for an image forming operation, such as adjustment or printing operation (Step S907). Through the completion of the preparation operation, the image forming apparatus 1 is ready to execute a normal image forming operation.

In this manner, the image forming apparatus 1 according to the first embodiment automatically executes an initialization operation after the replacement of the failure part, to thereby be able to reliably execute initialization and form an image under an appropriate state even after the replacement of the part. It is determined whether the failure part has been replaced with a normal part before the execution of the preparation operation, and thus an excessive period of time is prevented from being consumed at the time of reactivation, or a consumable is prevented from being wasted.

Second Embodiment

Control Block Diagram

Figure 10:
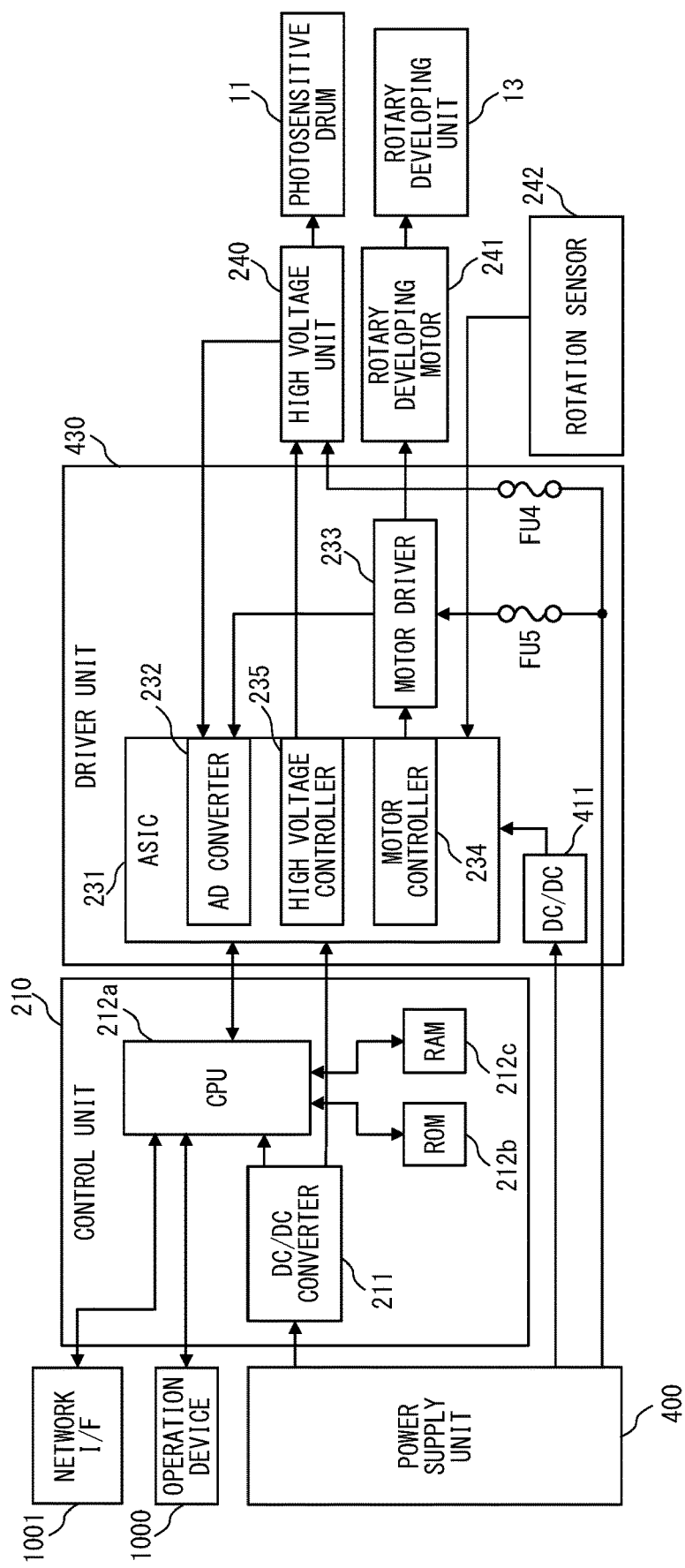
FIG. 10 is a control block diagram of the image forming apparatus.
Figure 11:
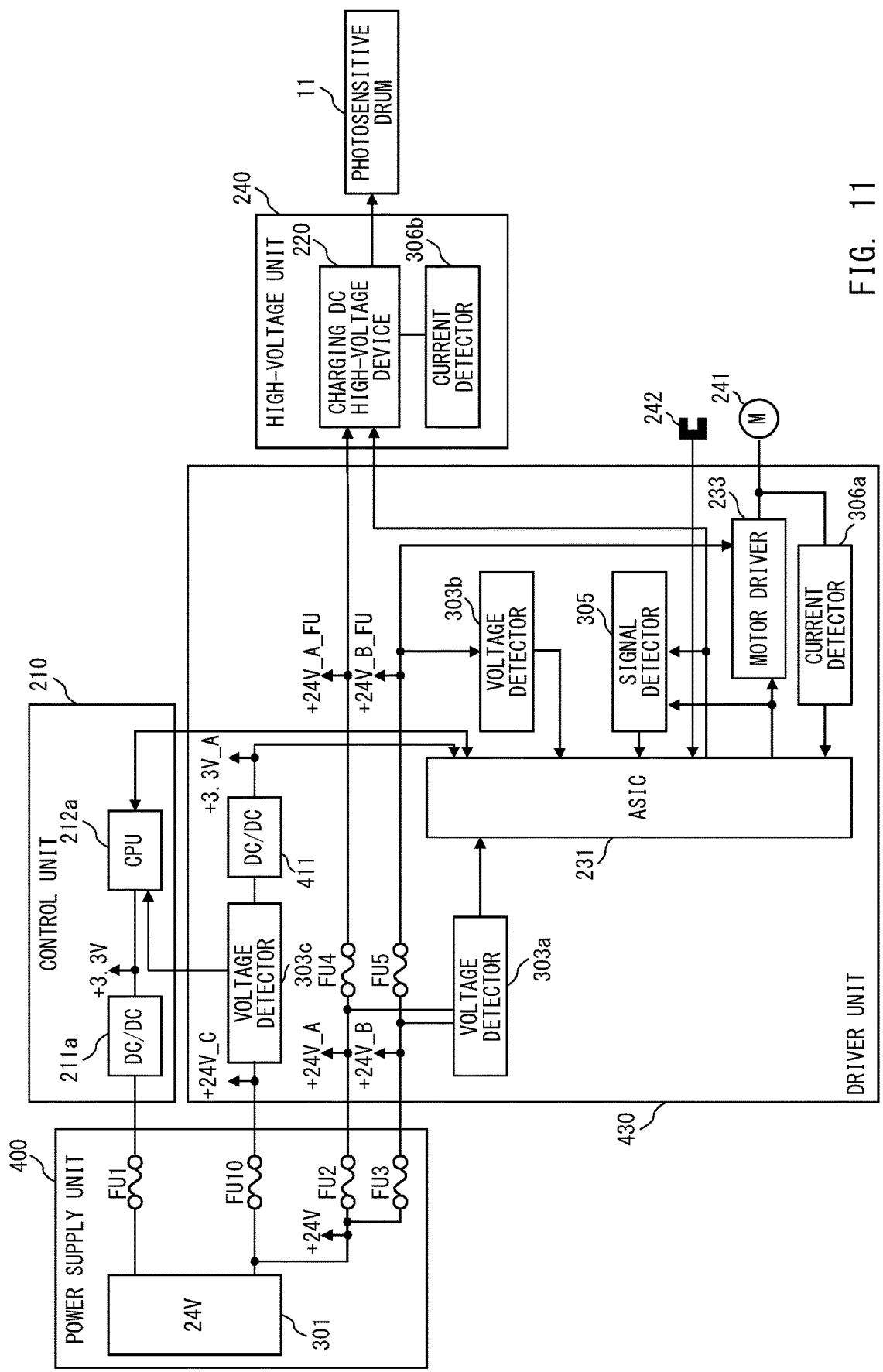
FIG. 11 is a control block diagram of the image forming apparatus.

FIG. 10 and FIG. 11 are each a control block diagram of the image forming apparatus 1 according to a second embodiment of the present invention. The control block diagrams of the second embodiment are different from the control block diagrams of FIG. 2 and FIG. 3 in the configurations of the power supply unit 400 and the driver unit 430.

A board (first board) of the power supply unit 400 in the second embodiment has a configuration in which a fuse FU10 is added to the power supply unit 200 of the image forming apparatus in the first embodiment. A board (second board) of the driver unit 430 in the second embodiment has a configuration in which a voltage detector 303c and a DC/DC converter 411 are added to the driver unit 230 in the first embodiment.

Now, description is given of the power supply system. The power supply unit 400 includes the voltage generator 301 configured to output the power supply voltage of +24 V. The power supply unit 400 distributes the power supply voltage to a plurality of voltage supply systems, to thereby supply voltage to each part via the fuses FU1 to FU3 and FU10. The control unit 210 drops the power supply voltage of +24 V, which has been supplied from the power supply unit 400, to a voltage of 3.3 V by the DC/DC converter 211, to thereby supply voltage to the CPU 212a and the driver unit 230, for example. The driver unit 430 supplies the power supply voltage of +24 V, which has been supplied from the power supply unit 400, to the high-voltage unit 240 or the motor driver 233 via the fuses FU4 and FU5. Further, the driver unit 430 drops the power supply voltage of +24 V, which has been supplied from the power supply unit 400, to a voltage of 3.3 V by the DC/DC converter 411, to thereby supply voltage to the ASIC 231.

The signal output device, the load driver, and the load are similar to those in the first embodiment.

Identification of Failure Portion

Also in the second embodiment, the failure portion is identified by using the failure portion identification table described with reference to FIG. 4. In addition, in the second embodiment, the failure portion can be identified also in a case where an abnormality of communication between the CPU 212a and the ASIC 231 has occurred. FIG. 12 is an explanatory table of the failure portion identification processing in the case of an abnormality of communication between the CPU 212a and the ASIC 231. In this case, an operation of a load is not involved, and thus only the power supply failure portion identification function is executed. FIG. 12 is a failure portion identification table in the case of a communication abnormality.

The failure portion is identified in the following manner in a case where an abnormality of communication between the CPU 212a and the ASIC 231 has occurred. In a case where the failure portion identification function is activated, the CPU 212a starts to check the power supply system by using the power supply system failure portion identification function. As shown in FIG. 12, in a case where a communication abnormality has occurred, the CPU 212a checks the voltage of the power supply voltage (+24V_C) at a subsequent stage of the fuse FU10 of the power supply unit 400 in order to check the failure portion of the power supply system. The voltage detector 303c of the driver unit 430 detects whether the power supply voltage (+24V_C) is equal to or larger than a predetermined value (threshold value) in order to check the power supply voltage (+24V_C). In this case, the threshold value is set to be 18 V.

The result of detection by the voltage detector 303c is transmitted to the CPU 212a via the ASIC 231. The CPU 212a diagnoses the failure portion based on the result of detection by the voltage detector 303c. In a case where the detection result indicates the fact that the value of the power supply voltage (+24V_C) is equal to or larger than 18 V, the CPU 212a determines that the output by the power supply unit 400 is normal. In a case where the detection result indicates the fact that the value of the power supply voltage (+24V_C) is smaller than 18 V, the CPU 212a determines that the output by the power supply unit 400 is abnormal. When determining that the output by the power supply unit 400 is abnormal, the CPU 212a identifies a path (fuse FU10) that outputs the power supply voltage (+24V_C) of the power supply unit 400 as the failure portion. The image forming apparatus 1 according to the second embodiment does not support replacement of only the fuse parts, and replacement is performed in units of power supply units. Thus, in this case, the CPU 212a identifies the power supply unit 400 as the failure part (parts to be replaced) (power supply output abnormality). After the processing of identifying the failure portion, the CPU 212a notifies of the processing result. The CPU 212a gives a notification by displaying the processing result on the operation device 1000, for example.

In this manner, in the second embodiment, as shown as an example in the failure portion identification tables of FIG. 4 and FIG. 12, any one of the failure diagnosis involving the load failure portion identification function and the failure diagnosis not involving the load failure portion identification function is executed in accordance with the type of control abnormality.

Operation Mode

Image forming processing including the processing of identifying the failure portion is executed similarly to the processing described with reference to FIG. 6 of the first embodiment.

Figure 13:
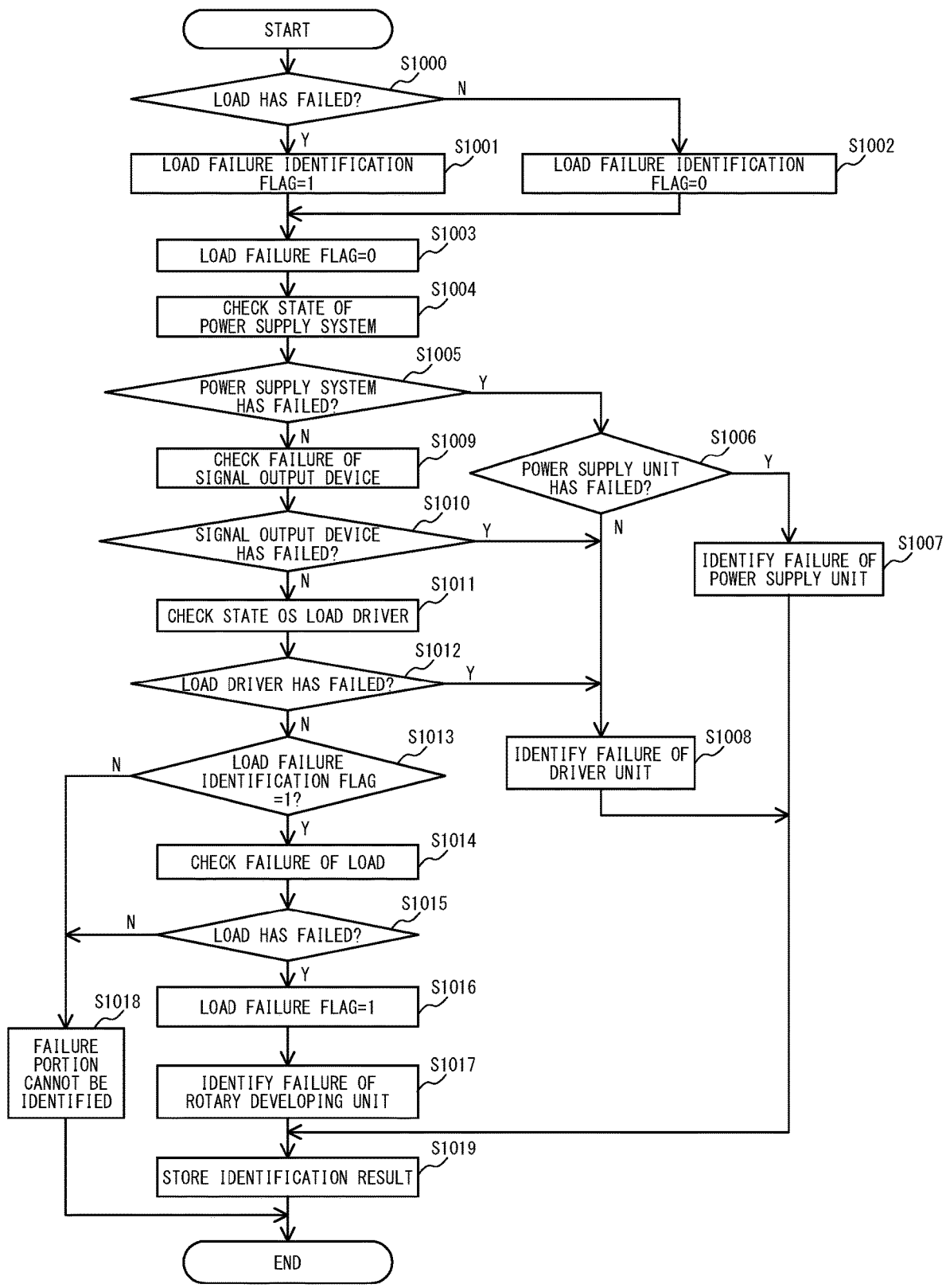
FIG. 13 is a flow chart for illustrating the failure portion identification processing.

FIG. 13 is a flow chart for illustrating the processing of identifying the failure portion in Step S503 of FIG. 6 in the second embodiment. This processing is the processing of identifying the failure portion in a case where a control abnormality (error) of the rotary developing unit 13 has occurred.

The CPU 212a determines whether the caused error is an error involving the load failure portion identification function (Step S1000). In a case where the caused error involves the load failure portion identification function (Step S1000: Y), the CPU 212a sets a load failure identification flag to "1" (Step S1001). In a case where the caused error does not involve the load failure portion identification function (Step S1000: N), the CPU 212a sets the load failure identification flag to "0" (Step S1002). In a case where the caused error does not involve the load failure portion identification function, the error is a communication abnormality, for example. After the load failure identification flag is set, the CPU 212a initializes a load failure flag to "0" (Step S1003). The load failure flag indicates whether the load is identified as the failure portion.

Next, the CPU 212a checks the output state of the power supply system (Step S1004). The CPU 212a executes this processing by using the power supply system failure portion identification function. When there is no output from the power supply system, this means a failure of the power supply system. In a case where the power supply system has failed (Step S1005: Y), the CPU 212a determines whether the power supply unit 400 (fuse FU3) has failed (Step S1006). In a case where the power supply unit 400 (fuse FU3) has failed (Step S1006: Y), the CPU 212a identifies the power supply unit 400 as the failure portion (Step S1007). In a case where the power supply unit 400 has not failed (Step S1006: N), the CPU 212a identifies the driver unit 430 (fuse FU5) as the failure portion (Step S1008).

The CPU 212a, which has identified the failure portion, stores the identification result into a storage area of the RAM 212c that can store data permanently (Step S1019). The identification result includes the identified failure portion information and the load failure flag. The failure portion information is information representing the failure portion and representing which of, for example, the power supply system failure portion identification function and the signal output device failure portion identification function described above is used to identify the failure portion. For example, in a case where the power supply unit 400 is identified as the failure part, the failure portion information is information representing the power supply unit 400 and the fact that the failure portion is identified by using the power supply system failure portion identification function. In a case where the power supply unit 400 is not identified as the failure part, the failure portion information is information representing the driver unit 430 and the fact that the failure portion is identified by using the power supply system failure portion identification function.

In a case where the power supply system has not failed (Step S1005: N), the CPU 212a checks the signal output state of the signal output device (Step S1009). The CPU 212a executes this processing by using the signal output device failure portion identification function. In a case where an appropriate signal has not been output, this means a failure of the signal output device. In a case where the signal output device has failed (Step S1010: Y), replacement of a part of only the signal output device is not supported, and thus the CPU 212a identifies the driver unit 430 (motor controller 234) as the failure part (Step S1008). In this case, the failure portion information is information representing the driver unit 430 and the fact that the failure portion is identified by using the signal output device failure portion identification function (Step S1019). The CPU 212a, which has identified the failure portion, stores the identification result into a storage area of the RAM 212c that can store data permanently.

In a case where the signal output device has not failed (Step S1010: N), the CPU 212a checks the signal output state of the load driver (Step S1011). The CPU 212a executes this processing by using the load driver failure portion identification function. In a case where an appropriate signal has not been output, this means a failure of the load driver. In a case where the load driver has failed (Step S1012: Y), the CPU 212a identifies the driver unit 430 (motor driver 233) as the failure part because the motor driver 233 is mounted on the driver unit 430 (Step S1008). In this case, the failure portion information is information representing the driver unit 430 and the fact that the failure portion is identified by using the load driver failure portion identification function (Step S1019). The CPU 212a, which has identified the failure portion, stores the identification result into a storage area of the RAM 212c that can store data permanently.

In a case where the load driver has not failed (Step S1012: N), the CPU 212a checks the value of the load failure identification flag (Step S1013). In a case where the load failure identification flag indicates "1" (Step S1013: Y), the CPU 212a checks a failure of the load by using the load failure portion identification function (Step S1014). In a case where the load is not in operation, this means a failure of the load. In a case where the load has failed (Step S1015: Y), the CPU 212a sets the load failure flag to "1" (Step S1016), and identifies the rotary developing unit 13 as the failure part (Step S1017). The CPU 212a, which has identified the failure portion, stores the identification result into a storage area of the RAM 212c that can store data permanently (Step S1019). In this case, the failure portion information is information representing the rotary developing unit 13 and the fact that the failure portion is identified by using the load failure portion identification function.

In a case where the load failure identification flag indicates "0" (Step S1013: N), or the load has not failed (Step S1015: N), the CPU 212a determines that the failure portion cannot be identified by all the failure portion identification functions. In this case, the CPU 212a determines that the failure portion cannot be identified (Step S1018). In a case where it is determined that the failure portion cannot be identified, the CPU 212a does not execute processing of storing the identification result into the RAM 212c.

Figure 14:
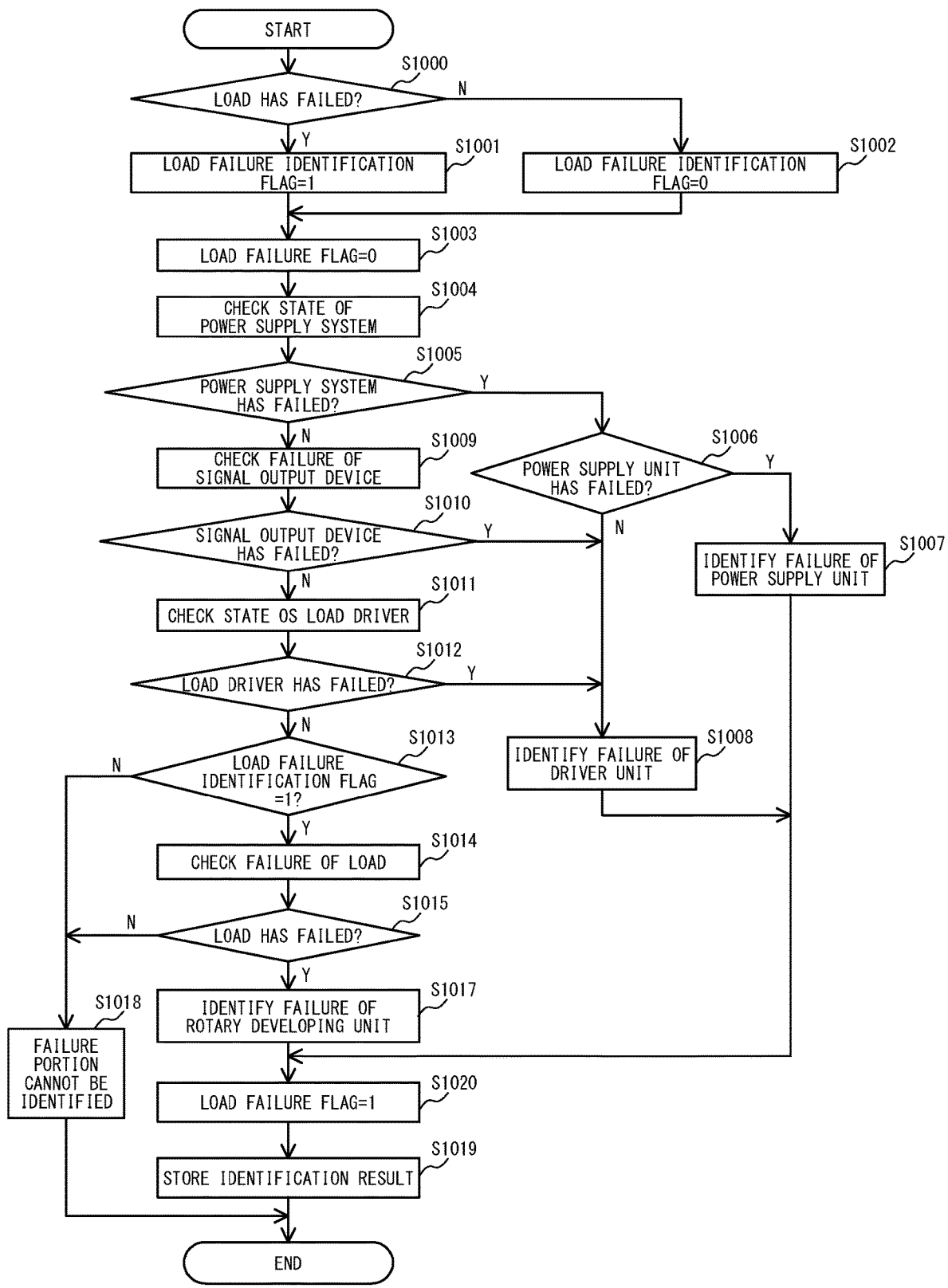
FIG. 14 is a flow chart for illustrating the failure portion identification processing.
Figure 15:
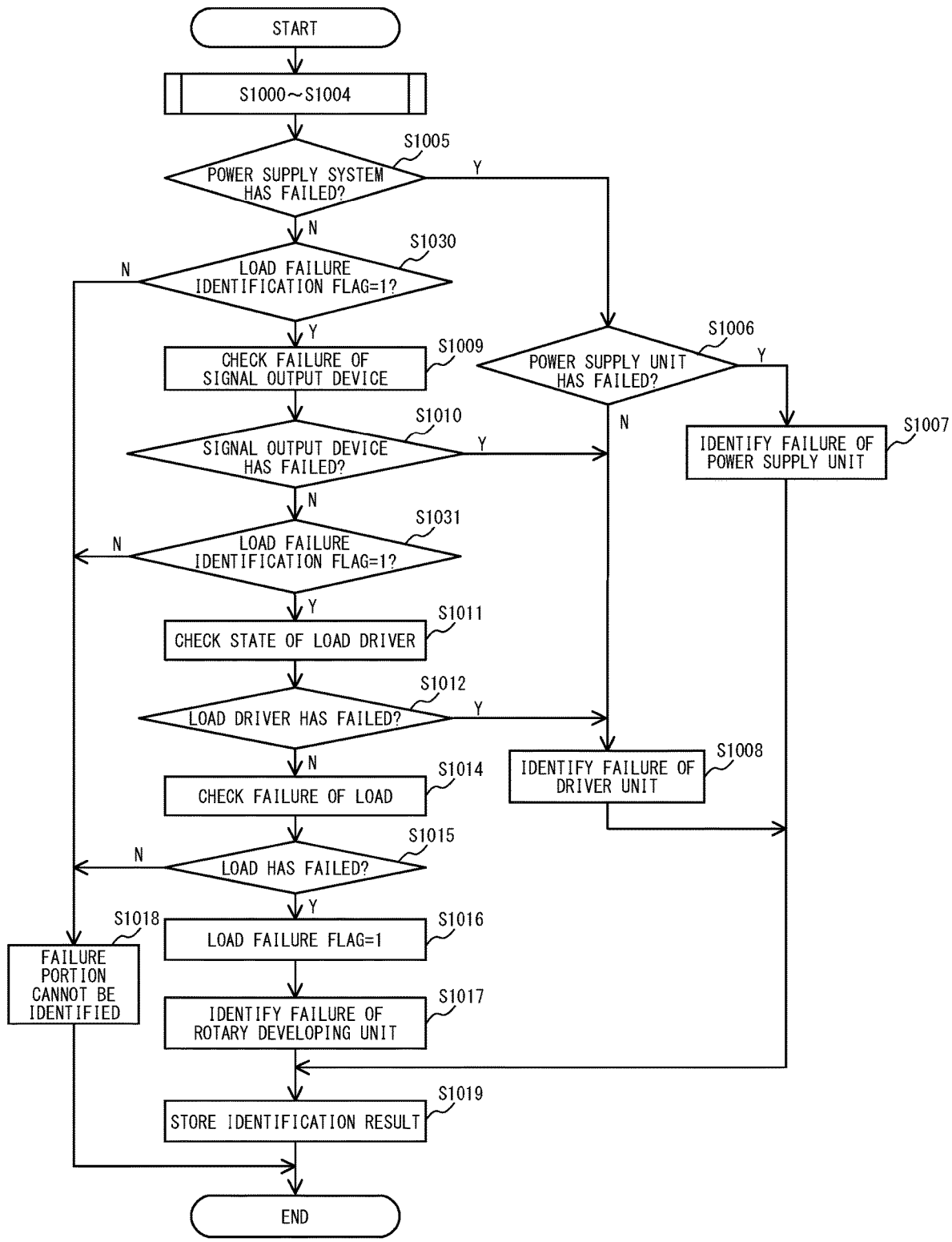
FIG. 15 is a flow chart for illustrating the failure portion identification processing.

FIG. 14 and FIG. 15 are separate flow charts for illustrating the processing of identifying the failure portion in Step S503. The same reference step number is assigned to a step that executes the same processing as that of FIG. 13, and the description thereof is omitted here. In the processing of FIG. 14, the timing of setting the load failure flag to "1" is different from that of FIG. 13. In the processing of FIG. 14, the load failure flag is set to "1" after the identification of the failure portion (after Step S1007, Step S1008, and Step S1017). In the processing of FIG. 15, the timing of checking the value of the load failure identification flag is different from that of the processing of FIG. 13. In the processing of FIG. 15, the value of the load failure identification flag is checked after it is determined in the processing of Step S1005 that the power supply has not failed (Step S1030). In the case of a communication abnormality described with reference to FIG. 12, it is determined in the processing of Step S1030 that the value of the load failure identification flag is "0". Further, the value of the load failure identification flag is checked after it is determined in the processing of Step S1010 that the signal output device has not failed (Step S1031).

The image forming apparatus 1 according to the second embodiment checks whether a control abnormality (error) has been resolved before the execution of the preparation operation for enabling an image forming operation after the identification of the failure portion. The CPU 212a determines again a portion (part) that has been determined to have failed after the identification of the failure portion, by using the same failure portion identification function. In a case where the failure portion is determined to be "normal" in the next determination, the CPU 212a determines that the state of the failure portion has changed. That is, the CPU 212a determines that a part of the failure portion has been replaced after the identification of the failure portion. In a case where the portion remains to have an "error" in the next determination, the CPU 212a determines that a part of the failure portion has not been replaced because there is no change in the portion, or the part after the replacement has also failed.

Now, description is given of an exemplary case in which the signal detector 305 has detected a motor control signal of 0.8 V or more by using the signal output device failure portion identification function. After that, in a case where the same signal output device failure portion identification function is used again and the part is normal, a motor control signal of a voltage smaller than 0.8 V is detected. However, in a case where the part has failed, a motor control signal of 0.8 V or more is likely to be detected similarly to the previous determination. That is, whether a part of the failure portion has been replaced can be checked by using again the failure portion identification function, which has been used at the time of identification of the failure portion.

Figure 16:
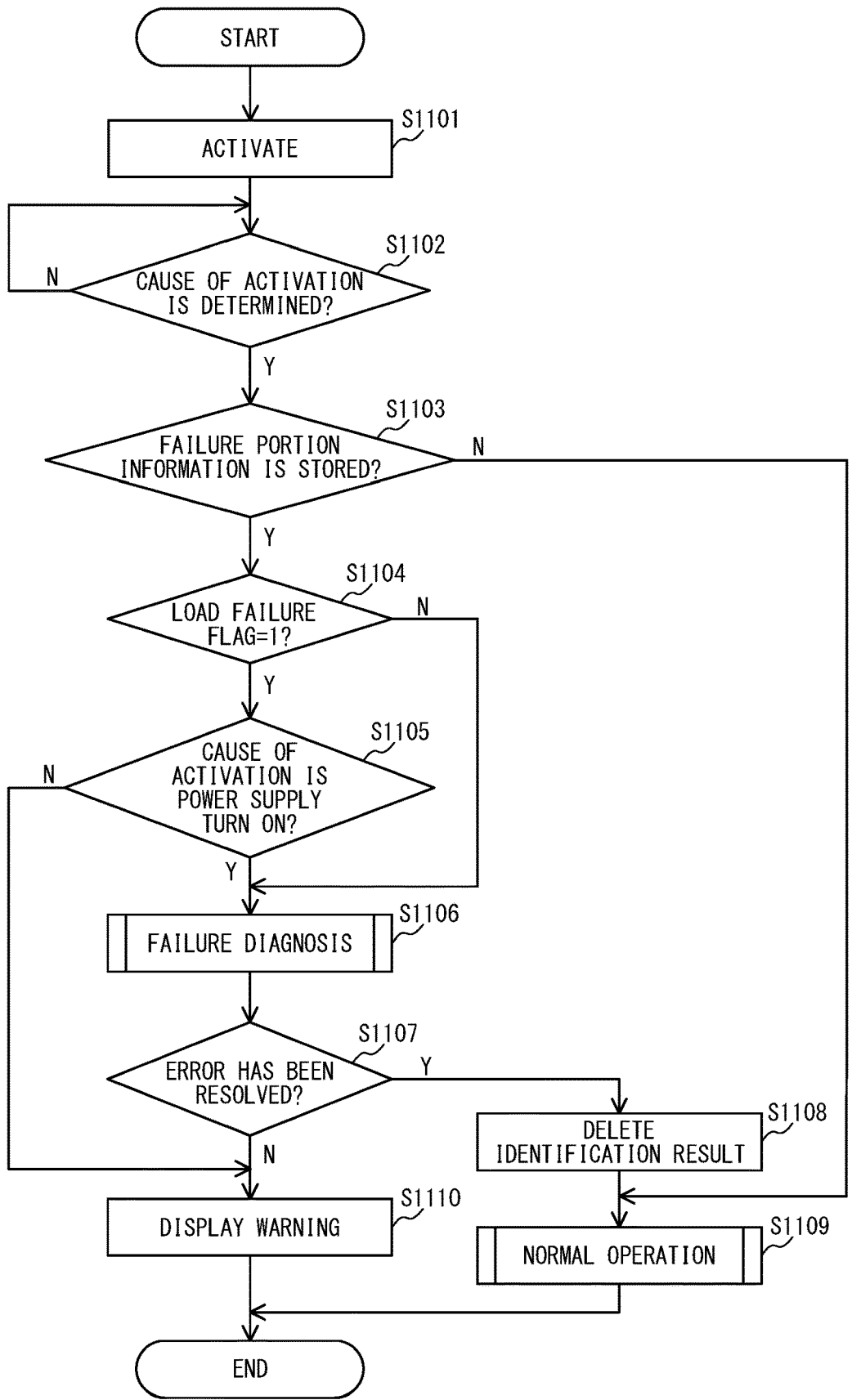
FIG. 16 is a flow chart for illustrating processing to be executed by a failure portion identification function.

FIG. 16 is a flow chart for illustrating processing to be executed by the failure portion identification function again at the time of activation before the execution of the preparation operation for enabling an image forming operation after the identification of the failure portion. Now, description is given of a timing of executing the failure portion identification function based on an exemplary case after the power supply is turned on or after the mode has returned from the power saving mode.

In a case where the image forming apparatus 1 is activated (Step S1101), the CPU 212a waits until a cause of an activation is determined (Step S1102: N). The cause of the activation is a power supply operation (power supply being turned on) or an operation of returning from the power saving mode. In a case where the cause of the activation is determined (Step S1102: Y), the CPU 212a checks whether the failure portion information is stored in the RAM 212c (Step S1103).

In a case where the failure portion information is stored (Step S1103: Y), the CPU 212a checks the value of the load failure flag (Step S1104). In a case where the load failure flag is "0" (Step S1104: N), the CPU 212a executes failure diagnosis based on the failure portion information (Step S1106). The failure diagnosis executed at this timing is the processing of identifying the failure portion illustrated as an example in FIG. 13 to FIG. 15. The CPU 212a determines whether a control abnormality (error) due to the failure portion has been resolved based on the result of execution of the failure diagnosis (Step S1107). In a case where the error has not been resolved (Step S1107: N), the CPU 212a notifies the operation device 1000 of the fact that the error has not been resolved, and finishes the processing. For example, the CPU 212a displays a warning screen, and finishes the processing (Step S1110). The warning screen includes details illustrated in FIG. 5, for example. The case in which the error has not been resolved is a case in which the signal detector 305 has detected a motor control signal of 0.8 V or more, for example.

In a case where the error has been resolved (Step S1107: Y), the CPU 212a determines that the identified failure portion has been properly handled by replacement, for example. This corresponds to the processing of Step S1018 of FIG. 13 to FIG. 15. In this case, the CPU 212a deletes the identification result (e.g., failure portion information and load failure flag) stored in the RAM 212*c* (Step S1108). The case in which the error has been resolved is a case in which the signal detector 305 has detected a motor control signal of a voltage smaller than 0.8 V, for example.

After that, the CPU 212*a* executes a normal operation, such as adjustment or printing operation (Step S1109). In a case where the failure portion information is not stored in the RAM 212*c* (Step S1103: N), the failure portion is not identified before the activation, and thus the CPU 212*a* executes the preparation operation for an image forming operation, such as adjustment or printing operation, and finishes the processing (Step S1109).

In a case where the load failure flag indicates "1" (Step S1104: Y), the CPU 212*a* determines whether the activation cause is "power supply being turned on" (Step S1105). In a case where the activation cause is "power supply being turned on" (Step S1105: Y), the service engineer is likely to have finished the repairs, and thus the CPU 212*a* executes the failure diagnosis even when the load failure flag indicates "1" (involving the load failure diagnosis) (Step S1106). The CPU 212*a* executes processing subsequent to Step S1107 after the execution of the failure diagnosis. In a case where the activation cause is not "power supply being turned on" (return from the power saving mode) (Step S1105: N), the service engineer is likely not to have finished the repairs, and the user is likely to use a function (e.g., scanning function) that does not use the failure portion. Thus, the CPU 212*a* displays a warning screen on the operation device 1000 without executing the failure diagnosis, and finishes the processing (Step S1110).

The image forming apparatus 1 according to the second embodiment described above executes the processing of identifying the failure portion again before the execution of the preparation operation for enabling an image forming operation after the identification of the failure portion. At this time, the image forming apparatus 1 determines whether to execute failure diagnosis involving an operation of a load depending on the activation cause. With this, the image forming apparatus 1 is prevented from executing the failure diagnosis involving the operation of a load every time the image forming apparatus 1 has returned from the power saving mode. That is, unrequired failure diagnosis is prevented. Thus, it is possible to execute the failure diagnosis while at the same time preventing deterioration in usability at the time of occurrence of an abnormality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-137268, filed Jul. 25, 2019 and Japanese Patent Application No. 2019-122963, filed Jul. 1, 2019, which are hereby incorporated by reference herein in their entirety.

What is claimed is:

1. An image forming apparatus, comprising:
a plurality of parts each configured to operate to form an image; and
at least one processor configured to control an operation of the image forming apparatus,
wherein the at least one processor has a function of executing the following processing:

error detection processing of detecting, under a state in which each of the plurality of parts is caused to operate, occurrence of an error of each part;
failure portion identification processing of identifying, in a case where occurrence of an error is detected by the error detection processing, a failure portion which is a cause of the error;
storage processing of storing, into a memory, failure portion information on the failure portion identified by the failure portion identification processing; and
determination processing of determining, in a case where the image forming apparatus is reactivated after the failure portion is identified by the failure portion identification processing, whether there is a failure in a part corresponding to the failure portion information or not before execution of a preparation operation for enabling an image forming operation.

2. The image forming apparatus according to claim 1, wherein, in the determination processing, the at least one processor is configured to determine whether there is a failure in the part corresponding to the failure portion information by using the failure portion identification processing.

3. The image forming apparatus according to claim 2, wherein, in the determination processing, the at least one processor is configured to determine that the part corresponding to the failure portion information has not been replaced with a normal part in a case where a failure has been detected by the failure portion identification processing, and to determine that the part corresponding to the failure portion information has been replaced with a normal part in a case where a failure has not been detected by the failure portion identification processing.

4. The image forming apparatus according to claim 1, wherein the at least one processor is configured to delete the failure portion information stored in the memory in a case where a failure has not been detected by the determination processing.

5. The image forming apparatus according to claim 1, wherein the at least one processor is configured to execute the preparation operation in a case where a failure has not been detected by the determination processing.

6. The image forming apparatus according to claim 3, wherein, when determining that the part corresponding to the failure portion information has been replaced with a normal part, the at least one processor is configured to execute initialization processing for the part corresponding to the failure portion information.

7. The image forming apparatus according to claim 3, wherein, when determining that the failure part has not been replaced with a normal part, the at least one processor is configured to issue a warning for the failure part.

8. The image forming apparatus according to claim 7, wherein, when determining that the part corresponding to the failure portion information has not been replaced with a normal part, the at least one processor is configured to display, as the warning, an instruction to replace the part corresponding to the failure portion information on a predetermined display.

9. The image forming apparatus according to claim 7, further comprising a network interface for communicating to/from an external apparatus,
wherein, when determining that the part corresponding to the failure portion information has not been replaced with a normal part, the at least one processor is configured to issue, as the warning, information on the part corresponding to the failure portion information to the external apparatus via the network interface.

10. The image forming apparatus according to claim 1, wherein the plurality of parts include:
a power supply configured to supply a voltage for forming an image;
a load configured to operate to form an image;
a load controller configured to operate by being supplied with a voltage from the power supply, to thereby control an operation of the load; and
a signal output device configured to operate by being supplied with a voltage from the power supply, to thereby output, to the load controller, a control signal for controlling an operation to be executed by the load controller, and
wherein the at least one processor is configured to identify a failure portion being the cause of the error by executing at least one of:
first failure portion identification processing to be used for identifying a failure portion of the power supply;
second failure portion identification processing to be used for identifying a failure portion of the signal output device;
third failure portion identification processing to be used for identifying a failure portion of the load controller; or
fourth failure portion identification processing to be used for identifying a failure portion of the load.

11. The image forming apparatus according to claim 10, wherein the at least one processor is configured to execute:
the first failure portion identification processing;
the second failure portion identification processing in a case where a failure portion is not identified by the first failure portion identification processing;
the third failure portion identification processing in a case where a failure portion is not identified by the second failure portion identification processing; and
the fourth failure portion identification processing in a case where a failure portion is not identified by the third failure portion identification processing.

12. The image forming apparatus according to claim 10, wherein the at least one processor is configured to:
store, into the memory, information on the first failure portion identification processing as a part of the failure portion information in a case where the power supply has a failure portion;
store, into the memory, information on the second failure portion identification processing as a part of the failure portion information in a case where the signal output device has a failure portion;
store, into the memory, information on the third failure portion identification processing as a part of the failure portion information in a case where the load controller has a failure portion; and
store, into the memory, information on the fourth failure portion identification processing as a part of the failure portion information in a case where the load has a failure portion.

13. The image forming apparatus according to claim 1, wherein the plurality of parts include:
a power supply configured to supply a voltage for forming an image;
a load configured to operate to form an image by being supplied with a voltage from the power supply;
a load controller configured to control an operation of the load by being supplied with a voltage from the power supply; and
a sensor configured to detect a state of an operation of the load,
wherein, in a case where an abnormality of an operation of the load is detected based on a signal from the sensor, the at least one processor is configured to identify a failure portion by executing any one of first failure diagnosis of executing processing of identifying a failure portion involving an operation of the load and second failure diagnosis of executing processing of identifying a failure portion without involving an operation of the load.

14. The image forming apparatus according to claim 13, wherein, before the execution of the preparation operation to be executed upon the activation of the image forming apparatus after the identification of the failure portion, the at least one processor is configured to execute one of the first failure diagnosis and the second failure diagnosis in a case where the load has the identified failure portion and a cause of the activation of the image forming apparatus is a power supply operation, and avoids executing the first failure diagnosis in a case where the load has the identified failure portion and the cause of the activation is not a power supply operation.

15. The image forming apparatus according to claim 14, wherein, before the execution of the preparation operation to be executed upon the activation of the image forming apparatus after the identification of the failure portion, the at least one processor is configured to notify of a fact that a failure of the failure portion has not been resolved in a case where the load has the identified failure portion and the cause of the activation of the image forming apparatus is not the power supply operation.

16. The image forming apparatus according to claim 13, wherein, before the execution of the preparation operation to be executed upon the activation of the image forming apparatus after the identification of the failure portion, the at least one processor is configured to display a screen representing a fact that a failure of the failure portion has not been resolved in a case where the load has the identified failure portion and the cause of the activation of the image forming apparatus is not the power supply operation.

17. The image forming apparatus according to claim 13, wherein, before the execution of the preparation operation to be executed upon the activation of the image forming apparatus after the identification of the failure portion, the at least one processor is configured to execute the second failure diagnosis irrespective of the cause of the activation of the image forming apparatus in a case where the load does not have the identified failure portion.

18. The image forming apparatus according to claim 13, wherein, before the execution of the preparation operation to be executed upon the activation of the image forming apparatus after the identification of the failure portion, the at least one processor is configured to execute one of the first failure diagnosis and the second failure diagnosis, and executes the preparation operation in a case where the failure of the identified failure portion has been resolved.

19. The image forming apparatus according to claim 18, wherein, before the execution of the preparation operation to be executed upon the activation of the image forming apparatus after the of the failure portion, the at least one identification processor is configured to execute one of the first failure diagnosis and the second failure diagnosis, and notifies of a fact that the failure of the failure portion has not been resolved in a case where the failure has not been resolved.

20. The image forming apparatus according to claim 18, wherein, before the execution of the preparation operation to be executed upon the activation of the image forming apparatus after the identification of the failure portion, the at least one processor is configured to display a screen representing a fact that the failure of the failure portion has not been resolved in a case where the load has the identified failure portion and the cause of the activation of the image forming apparatus is not the power supply operation.

* * * * *